United States Patent
Suzuki et al.

(10) Patent No.: US 11,154,835 B2
(45) Date of Patent: Oct. 26, 2021

(54) CONTINUOUS POLYMERIZATION APPARATUS AND CONTINUOUS PRODUCTION METHOD FOR POLYMER

(71) Applicant: Kureha Corporation, Tokyo (JP)

(72) Inventors: Kenji Suzuki, Tokyo (JP); Michihisa Miyahara, Tokyo (JP); Hiroshi Sakabe, Tokyo (JP); Yuichi Ishioka, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/314,514

(22) PCT Filed: Oct. 11, 2018

(86) PCT No.: PCT/JP2018/037915
§ 371 (c)(1),
(2) Date: Dec. 31, 2018

(87) PCT Pub. No.: WO2019/074054
PCT Pub. Date: Apr. 18, 2019

(65) Prior Publication Data
US 2020/0391172 A1      Dec. 17, 2020

(30) Foreign Application Priority Data

Oct. 12, 2017   (JP) .............................. JP2017-198714

(51) Int. Cl.
*B01J 19/06* (2006.01)
*B01J 19/24* (2006.01)
(Continued)

(52) U.S. Cl.
CPC ............. *B01J 19/06* (2013.01); *B01J 19/245* (2013.01); *C08G 65/4012* (2013.01);
(Continued)

(58) Field of Classification Search
CPC ..... B01J 19/06; B01J 19/245; C08G 65/1012; C08G 65/4093; C08G 75/14;
(Continued)

(56) References Cited

U.S. PATENT DOCUMENTS 4,056,515 A    11/1977    Vidaurri, Jr.
4,060,520 A    11/1977    Irvin
(Continued)

FOREIGN PATENT DOCUMENTS

CN    102597013 A    7/2012
EP     0351781 A2    1/1990
(Continued)

OTHER PUBLICATIONS

Office Action from Chinese Patent Application No. 201880002465.7 dated Feb. 19, 2021, 20 pages.
(Continued)

*Primary Examiner* — Shane Fang
(74) *Attorney, Agent, or Firm* — Abel Schillinger, LLP

(57) ABSTRACT

The present invention provides a continuous polymerization apparatus capable of simply and efficiently separating a polymer and solid matter from a reaction mixture while having an apparatus configuration conducive to washing and maintenance, and a continuous production method for a polymer. A continuous polymerization apparatus (100) includes a plurality of reaction vessels (1a to 1c), wherein the plurality of reaction vessels are configured such that reaction mixtures (9a to 9c) successively move through each reaction vessel; in the plurality of reaction vessels, gas phase parts formed above the reaction mixture communicate with one another; and the continuous polymerization apparatus includes a washing part (5), the washing part configured to separate a solid included in the reaction mixture by sedimentation and to perform countercurrent washing.

13 Claims, 3 Drawing Sheets

(51) Int. Cl.
  *C08G 65/40* (2006.01)
  *C08G 75/0259* (2016.01)
  *C08G 75/20* (2016.01)
  *C08G 75/23* (2006.01)

(52) U.S. Cl.
  CPC ..... *C08G 65/4093* (2013.01); *C08G 75/0259* (2013.01); *C08G 75/20* (2013.01); *C08G 75/23* (2013.01); *B01J 2219/00033* (2013.01)

(58) Field of Classification Search
  CPC ............ C08G 75/0263; C08G 75/0268; C08G 75/0259; C08G 75/025; B30B 9/28
  See application file for complete search history.

(56) References Cited

U.S. PATENT DOCUMENTS

| | | | |
|---|---|---|---|
| 4,066,632 A | | 1/1978 | Anderson et al. |
| 4,175,175 A | * | 11/1979 | Johnson ............. C08G 65/4006 525/434 |
| 4,370,470 A | | 1/1983 | Anderson et al. |
| 4,659,755 A | | 4/1987 | Asanuma et al. |
| 4,734,484 A | | 3/1988 | Alfes et al. |
| 5,143,554 A | | 9/1992 | Koyama et al. |
| 5,175,208 A | | 12/1992 | Asanuma et al. |
| 5,792,883 A | * | 8/1998 | Harada .................. C07C 68/00 558/274 |
| 6,201,098 B1 | | 3/2001 | Haubs et al. |
| 6,734,282 B1 | | 5/2004 | Wagener et al. |
| 2005/0215759 A1 | * | 9/2005 | Matsuzaki ......... C08G 75/0254 528/373 |
| 2012/0302716 A1 | | 11/2012 | Kobayashi et al. |
| 2013/0116401 A1 | | 5/2013 | Kimura et al. |
| 2015/0087776 A1 | * | 3/2015 | Chiong ................ B01J 19/1862 524/606 |
| 2015/0087779 A1 | | 3/2015 | Chiong et al. |
| 2016/0144337 A1 | | 5/2016 | Im et al. |
| 2017/0029570 A1 | | 2/2017 | Kobayashi et al. |

FOREIGN PATENT DOCUMENTS

| | | |
|---|---|---|
| EP | 2572779 A1 | 3/2013 |
| EP | 2594598 A1 | 5/2013 |
| JP | S56-33003 A | 4/1981 |
| JP | S61-7301 A | 1/1986 |
| JP | S62086022 A | 4/1987 |
| JP | S62-126231 U | 8/1987 |
| JP | 2-276810 A | 11/1990 |
| JP | 3-86287 A | 4/1991 |
| JP | 2001503085 A | 3/2001 |
| JP | 2002542324 A | 12/2002 |
| JP | 2008-161848 A | 7/2008 |
| JP | 2008-285565 A | 11/2008 |
| JP | 2011111548 A | 6/2011 |
| KR | 1992-0006449 B1 | 8/1992 |
| WO | 2012/008340 A1 | 1/2012 |
| WO | 2015/166838 A1 | 11/2015 |
| WO | 2017/179327 A1 | 10/2017 |

OTHER PUBLICATIONS

Office Action from Maylasian Patent Application No. PI2018002833 dated Mar. 9, 2021, 2 pages.
Extended European Search Report for Application No. 18826164.8, dated Oct. 29, 2019, 9 pgs.
Office Action for Japanese Application No. 2018-558358, dated Nov. 12, 2019, 17 pgs.
Office Action for KR Application No. 10-2018-7036685, dated Apr. 20, 2020, 21 pgs.
English Translation of International Preliminary Report on Patentability from PCT Application No. PCT/JP2018/037915, dated Apr. 23, 2020, 12 pgs.
Office Action for IN Application No. 201817048425, dated Jun. 5, 2020, 6 pgs.
Office Action for EP Application No. 18826164.8, dated Nov. 27, 2020, 4 pgs.
International Search Report for PCT/JP2018/037915 dated Dec. 25, 2018, 11 pgs.

* cited by examiner

CONTINUOUS POLYMERIZATION APPARATUS AND CONTINUOUS PRODUCTION METHOD FOR POLYMER

TECHNICAL FIELD

The present invention relates to a continuous polymerization apparatus and a continuous production method for a polymer.

BACKGROUND ART

Various polymers are widely used as crucial industrial materials in a variety of applications such as various industrial materials, textile materials, and construction materials. For example, aromatic polythioethers represented by polyarylene sulfide (PAS); aromatic polysulfones represented by polysulfone (PSU), polyphenylsulfone (PPSU), and polyethersulfone (PES); aromatic polyetherketones represented by polyetheretherketone (PEEK) and polyetherketone (PEK); and aromatic polymers containing heteroatoms such as sulfur, oxygen, and nitrogen such as aromatic polyethernitrile (PEN) are engineering plastics exhibiting excellent heat resistance, chemical resistance, flame retardancy, mechanical strength, electrical characteristics, dimensional stability, and the like. Because these materials can be molded into various molded products, films, sheets, fibers, and the like by general melt processes such as extrusion molding, injection molding, and compression molding, they are used in a wide range of technical fields such as electric devices, electronic devices, automobile instruments, and packaging materials.

Examples of production methods for such polymers include methods using batch technique, and methods using a continuous technique have also been proposed. For example, Patent Documents 1 to 3 disclose continuous polymerization apparatuses for a polymer in which pressure-resistant polymerization vessels are connected in series, and a reaction solution is transported between the polymerization vessels by a pressure difference, and a continuous production method using the device.

In addition, Patent Documents 4 to 8 disclose methods of separating a polymer and a solid from a reaction mixture after or during polymerization. For example, Patent Document 4 discloses a treatment method for separating a salt or the like produced as a by-product by filtering a reaction mixture after polymerization with a heated pressure filter. Patent Document 5 discloses a method for separating a dissolved polymer from a solid, wherein a separated solid is washed with a countercurrent method. Patent Document 6 discloses a method of filtering a reaction mixture containing a polymer under specific temperature and pressure conditions. Patent Document 7 discloses a production method for a polymer including removing a salt during a polymerization reaction, which is produced as a by-product by the polymerization reaction. Patent Document 8 discloses a method of separating a salt produced as a by-product by centrifugation under pressure from a reaction mixture containing a polymer.

CITATION LIST

Patent Literature

Patent Document 1: U.S. Pat. No. 4,056,515
Patent Document 2: U.S. Pat. No. 4,060,520
Patent Document 3: U.S. Pat. No. 4,066,632
Patent Document 4: JP 62-086022 A
Patent Document 5: JP 2002-542324 T
Patent Document 6: US 2015/0087779A
Patent Document 7: JP 2001-503085 T
Patent Document 8: JP 2011-111548 A

SUMMARY OF INVENTION

Technical Problem

In a conventional continuous polymerization apparatus such as those disclosed in Patent Documents 1 to 3, a plurality of pressure-resistant polymerization vessels, and piping between the polymerization vessels, transfer equipment, instrumentation, and the like are necessary, for example, and the complex reaction apparatus tends to increase the production cost. In addition, a large amount of energy is required to drive the apparatus, it is difficult to achieve resource conservation, energy conservation, equipment cost reduction, or the like. In particular, in a solution desalting polycondensation reaction of polyphenylene sulfide (PPS) and the like, for example, a solid matter in the form of a salt produced as a by-product in an amount exceeding that of the target PPS tends to accumulate at the base of the reaction vessel. As a result, there is a problem in that the reaction space becomes smaller. In addition, the by-product salt is corrosive. Such a by-product adheres to the inside wall of the apparatus if left inside the apparatus, which causes problems such as rusting. It is therefore necessary to disassemble the complex apparatus for washing and maintenance with high frequency.

The methods disclosed in Patent Documents 4 to 8 are known as methods for separating and recovering a polymer and solid matter, but there is a demand for a method that is more conducive to maintenance.

The present invention was conceived in light of the problems described above, and an object of the present invention is to provide a continuous polymerization apparatus capable of simple and efficient separation of a polymer and solid matter from a reaction mixture while having an apparatus configuration which enables resource conservation, energy conservation, and equipment cost reduction and is conducive to washing and maintenance, and a continuous production method for a polymer.

Solution to Problem

The continuous polymerization apparatus of the present invention includes a plurality of reaction vessels, wherein the plurality of reaction vessels are configured such that a reaction mixture successively moves through each reaction vessel; in the plurality of reaction vessels, gas phase parts formed above the reaction mixture communicate with one another; and the continuous polymerization apparatus includes a washing part, the washing part being configured to separate a solid included in the reaction mixture by sedimentation and performing countercurrent washing.

In addition, the continuous production method for a polymer according to the present invention includes the following steps to be performed in parallel: (a) supplying a polymerization solvent and a reaction raw material to a continuous polymerization apparatus including a plurality of reaction vessels; (b) performing a polymerization reaction in the polymerization solvent inside at least one of the reaction vessels to form a reaction mixture; (c) removing at least a part of water in a gas phase part of the reaction vessel from the reaction vessel; (d) successively moving the reaction vessel through each reaction vessel; and (e) separating a solid included in the reaction mixture by sedimentation and performing countercurrent washing; wherein the respective gas phase parts of the plurality of reaction vessels communicate with one another.

Advantageous Effects of Invention

According to the embodiments of the present invention, it is possible to provide a continuous polymerization apparatus and a continuous production method which enable resource conservation, energy conservation, and equipment cost reduction and with which a polymer and solid matter can be separated simply and efficiently from a reaction mixture.

DESCRIPTION OF EMBODIMENTS

Embodiments of the present invention will be described in detail hereinafter, but the present invention is not limited to these embodiments.

Embodiment 1

Figure 1:
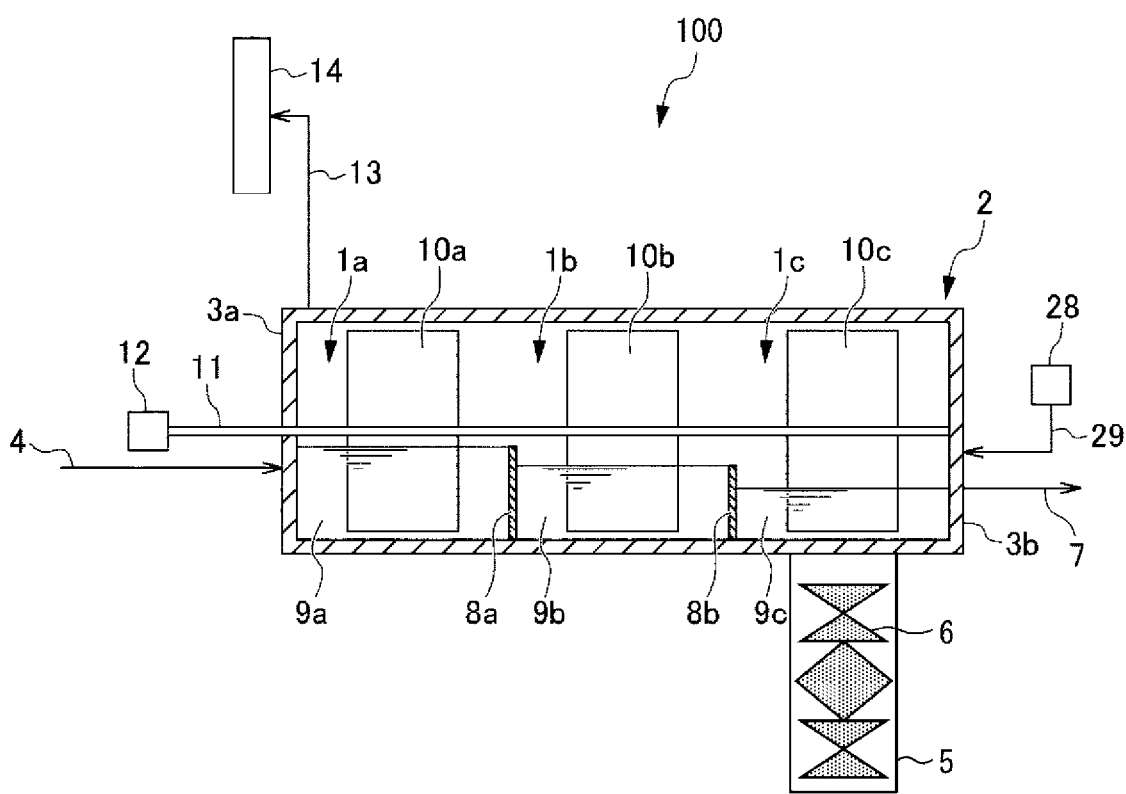
FIG. 1 is a partial cross-sectional view illustrating an embodiment of the continuous polymerization apparatus according to the present invention.

FIG. 1 is a partial cross-sectional view illustrating an embodiment (called "Embodiment 1" hereinafter) of the continuous polymerization apparatus according to the present invention. The configuration of Embodiment 1 will be described hereinafter with reference to FIG. 1.
Continuous Polymerization Apparatus A continuous polymerization apparatus 100 according to Embodiment 1 includes a housing chamber 2, which accommodates a plurality of reaction vessels 1a, 1b, and 1c.

The shape of the housing chamber 2 is a hollow cylindrical shape lying on the side, where a side wall 3a in contact with the reaction vessel 1a and a side wall 3b in contact with the reaction vessel 1c are the bottom faces of the hollow cylindrical shape. Note that the shape of the housing chamber 2 is not limited to this shape, and may be a hollow rectangular prism or the like that is pushed over on its side.

A supply line 4 configured to supply raw materials such as raw material monomers and a solvent to the housing chamber 2 continuously or intermittently is connected to the side wall 3a of the housing chamber 2, and a plurality of these may be provided. A water supply line configured to supply water to the housing chamber 2 may also be connected as necessary. A treated reaction product recovery line 7 configured to recover a treated reaction product from the housing chamber 2 is connected to the side wall 3b of the housing chamber 2. The treated reaction product is obtained by appropriately subjecting the reaction mixture to treatment such as washing. The solvent and various raw materials may be supplied to a liquid phase of the reaction vessel 1a through a gas phase part, or may be supplied directly to the liquid phase of the reaction vessel 1a.

As described above, a treated reaction product in this embodiment is a product obtained by appropriately subjecting the reaction mixture to treatment such as washing, and this refers to a reaction mixture from which at least some of the by-product salts have been separated or removed.

In addition, a temperature control device (not illustrated) such as a heater configured to adjust the temperature for each reaction vessel may be connected to the wall face of the housing chamber 2. Thus, the temperatures of the reaction vessels 1a to 1c may be increased from the upstream side toward the downstream side of the movement direction of the reaction mixture, for example.

The plurality of reaction vessels housed inside the housing chamber 2 are isolated by an appropriate isolation means such that the plurality of the reaction vessels may communicate with one another through the gas phase part of the housing chamber. In FIG. 1, the reaction vessel 1a and the reaction vessel 1b are separated by a partition wall 8a provided at the bottom of the housing chamber 2, and the reaction vessel 1b and the reaction vessel 1c are similarly separated by a partition wall 8b. The reaction vessels 1a, 1b, and 1c communicate with one another through the gas phase part in the housing chamber 2.

The reaction vessels 1a, 1b, and 1c are connected in series in the order described above. Note that in each reaction vessel excluding the reaction vessel 1a furthest upstream in the movement direction of the reaction mixture, the minimum height of the partition wall on the upstream side in the movement direction is higher than the maximum liquid surface level of that reaction vessel. That is, in the reaction vessel 1b, the minimum height of the partition wall 8a on the upstream side of the movement direction is higher than the maximum liquid surface level of the reaction vessel 1b, and in the reaction vessel 1c, the minimum height of the partition wall 8b on the upstream side in the movement direction is higher than the maximum liquid surface level of the reaction vessel 1c. As a result, backward flow from the reaction vessel 1b into the reaction vessel 1a and backward flow from the reaction vessel 1c into the reaction vessel 1b are prevented. The reaction vessels 1a, 1b, and 1c can respectively accommodate reaction mixtures 9a, 9b, and 9c. A sedimentation and separation tank may be provided downstream of the reaction vessel 1c (details given below).

As described, in a preferred embodiment of the continuous polymerization apparatus according to the present invention, the reaction vessels may be configured such that at least one pair among the combinations of adjacent reaction vessels is connected in the order of the highest maximum liquid surface level of a liquid that can be housed by each reaction vessel, and the reaction mixture moves from a reaction vessel with a higher maximum liquid surface level to a reaction vessel with a lower maximum liquid surface level.

With this configuration, the reaction mixture moves in accordance with gravity and the difference in the liquid surface level. Thus, it is unnecessary to provide a separate means for moving the reaction mixture to the next reaction vessel, which makes it possible to achieve a simple apparatus configuration.

In the housing chamber 2, a stirring blade 10a for stirring the reaction mixture 9a in the reaction vessel 1a, a stirring blade 10b for stirring the reaction mixture 9b in the reaction vessel 1b, and a stirring blade 10c for stirring the reaction mixture 9c in the reaction vessel 1c are installed on the same stirring shaft 11. The stirring shaft 11 is installed to pass through the side wall 3a from the outside of the housing chamber 2 and to reach the side wall 3b. A rotary driving device 12 configured to rotate the stirring shaft 11 is installed at the end of the stirring shaft 11 on the side wall 3a side.

One end of a discharge line 13 is connected near the side wall 3a of the housing chamber 2. A water removing part 14 configured to remove water from the gas phase in the housing chamber 2 is connected to the other end of the discharge line 13.

A gas feeding part 28 which communicates with the gas phase in the housing chamber 2 and feeds an inert gas to the gas phase from the downstream side toward the upstream side in the movement direction of the reaction mixture, i.e. from the reaction vessel 1c toward the reaction vessel 1a, is connected to the side wall 3b of the housing chamber 2 through a gas feeding line 29. The inert gas is not particularly limited, and examples thereof include noble gases such as argon; and nitrogen.

In addition, a treated reaction product recovery line 7 is further connected to the side wall 3b of the housing chamber 2. After minute amounts of a solid present in the treated reaction product recovered from the treated reaction product recovery line 7 are appropriately separated and removed by filtration or the like, the treated reaction product is subjected to a further purification operation, an additional polymerization reaction, or the like as necessary. The solid separated and removed is dissolved in water and the like, and discharged after water analysis. The solid in the present embodiment may be a salt that is a by-product of the desalting polycondensation, the reaction raw material, and the like.

A washing part 5 configured to separate a solid included in the reaction mixture by sedimentation and performing countercurrent washing on the reaction mixture is provided at the base of the reaction vessel 1c positioned furthest downstream in the movement direction of the reaction mixture. Note that the washing part may be provided even further on the downstream side of the reaction vessel positioned furthest downstream. "Further on the downstream side of the reaction vessel" in this specification may be, for example, a sedimentation and separation tank adjacent to the reaction vessel 1c on the opposite side to the reaction vessel 1b, along the treated reaction product recovery line 7, or the like. Providing the washing part on the reaction vessel positioned furthest downstream or on the downstream side of the reaction vessel positioned furthest downstream enables recovery of the treated reaction product from the treated reaction product recovery line 7 with dramatic reduction in the content of solid impurities such as a by-product salt. Thus, providing the washing part is preferable from the perspective of simplification of the purification operation or the like afterwards.

In the washing part, the substance to be washed is intended to be a reaction mixture or the like containing the solid.

The continuous polymerization apparatus 100 may further include a molecular chain extending part in which a reaction for further increasing the molecular weight of the polymer is performed. The molecular chain extending part is preferably a post-polymerization part configured to perform an additional polymerization reaction on the treated reaction product recovered from the treated reaction product recovery line 7. Examples of the post-polymerization part include a post-polymerization part using a polymerization reaction vessel such as a polymerization vessel, an extruder, or a heat treatment device. In the polymerization reaction vessel method, a reaction with a polymerization aid and a molecular chain extender or a functional group imparting agent, which are raw materials of an additional polymerization reaction can produce a polymer with a higher degree of polymerization, a polymer having branches or functional groups, and the like. As an extruder, a kneader capable of achieving molecular chain extension in a molten state, single-screw or multiple-screw heat kneader, or the like can be preferably used. Kneading the mixture together with a functional group imparting agent or the like as necessary can produce the desired polymer. In addition, the heat treatment in the presence of oxygen or in the presence of an inert gas in the heat treatment device can extend a molecular chain via a crosslinking/branching reaction.

In another embodiment, the washing part may be provided in any of the reaction vessels. Counting from the upstream side, the washing part is preferably provided in the second or a subsequent reaction vessel. The washing vessel is more preferably provided in the reaction vessel positioned furthest downstream. Providing the washing part further downstream enables the separation of the solid such as a by-product salt reaching the reaction vessel furthest downstream together with the reaction solution from the liquid in which the polymer, which is the final product, is dissolved. As a result, the polymer, which is the final product, is washed by the polymerization solvent or the like and can be recovered efficiently with solid impurities such as a salt removed.

Further, the washing part may also be provided in a reaction vessel in which a by-product salt tends to generate. The washing part is preferably provided at the base of the reaction vessel and is more preferably provided at the very bottom thereof. As a result, the reaction space can be prevented from shrinking as a result of the accumulation of a solid such as a by-product salt at the base of the reaction vessel, which makes it possible to reduce the frequency of washing and maintaining the apparatus. In addition, the by-product salt or the like accumulated at the base of the reaction vessel due to gravity can be recovered efficiently, which eliminates the need to separately provide a complex structure for separating and removing the solid and makes it possible to realize a simple apparatus configuration. In yet another embodiment, the washing part may be provided at the bases of a plurality of reaction vessels.

In addition, in the continuous polymerization apparatus 100, a sedimentation and separation tank may be further provided. The sedimentation and separation tank are adjacent to the reaction vessel 1c at the opposite side of the reaction vessel 1b, wherein the reaction vessel 1c is positioned furthest downstream in the movement direction of the reaction mixture. And a washing part may be provided at the base of the sedimentation and separation tank.

In the present embodiment, the washing part 5 includes a cylindrical structure extending in the vertical direction, and is suspended from the base of the reaction vessel 1c. Hereinafter, in the cylindrical structure, a side to the reaction vessel 1c is defined as an upper part, whereas the opposite side is defined as the lower part. The cylindrical structure constituting the washing part 5 includes a static mixing mechanism 6 in the cylinder. In addition, a washing solution is supplied to the washing part 5 through a washing solution supply line from the lower part toward the upper part of the washing part 5. Therefore, there exist a downward flow in which a solid is sedimented and an upward flow resulting from the washing solution fed from the lower part toward the upper part of the washing part, and these are stirred by a static mixing mechanism 6. As a result, it is possible to prevent insufficient stirring due to a short path and to efficiently wash the reaction mixture without consuming energy as in a dynamic stirrer. The washing solution is not particularly limited as long as the solid such as a by-product salt can be separated from the reaction mixture without affecting the properties of the reaction mixture, but a polymerization solvent, an organic solvent other than the polymerization solvent used for polymerization, mixtures of these and water, or the like, for example, can be used.

Examples of polymerization solvents include organic amide solvents; aprotic organic polar solvents containing an organic sulfur compound; and aprotic organic polar solvents containing a cyclic organic phosphorus compound.

Examples of organic amide solvents include N,N-dialkylformamides such as N,N-dimethylformamide, N,N-dimethylformamide, N,N-diethylformamide, and N,N-dipropylformamide; N,N-dialkylacetamides such as N,N-dimethylacetamide; N-alkylcaprolactam compounds such as N-methyl-ε-caprolactam, N-ethyl-ε-caprolactam, and N-propyl-ε-caprolactam; N-alkyl pyrrolidones or N-cycloalkyl pyrrolidones such as N-methyl-2-pyrrolidone (also called "NMP" hereinafter), N-ethyl-2-pyrrolidone, N-propyl-2-pyrrolidone, and N-cyclohexyl-2-pyrrolidone; N,N-dialkylimidazolidinone compounds such as N,N'-dimethylimidazolidinone, N,N'-diethylimidazolidinone, and N,N'-dipropylimidazolidinone; tetraalkylurea compounds such as tetramethylurea; and hexaalkylphosphoric triamide such as hexamethylphosphoric triamide. In the present invention, one type of polymerization solvent may be used alone, or two or more types may be used in combination.

Examples of aprotic organic polar solvents containing organic sulfur compounds include sulfones such as sulfolane (1,1-dioxothilane), hexamethylene sulfone, dimethyl sulfone, diethyl sulfone, diisopropyl sulfone, and diphenyl sulfone; and sulfoxides such as dimethyl sulfoxide and diethyl sulfoxide.

Examples of aprotic organic polar solvents containing cyclic organic phosphorus compounds include 1-methyl-1-oxophosphorane and the like.

Organic solvents other than the polymerization solvent used in polymerization include polymerization solvents described above that are not used in polymerization and organic solvents other than polymerization solvents. Examples of organic solvents other than polymerization solvents include alcohols, ketones, amines, carboxylic acids, and sulfonic acids.

An opening part (not illustrated), through which a slurry containing the solid accumulated at the base of the reaction vessel is supplied and the washing solution is discharged, is provided on the upper part of the washing part 5.

On the lower part of the washing part 5, a slurry extraction line, through which a slurry primarily containing a polymerization solvent such as N-methyl-2-pyrrolidone (NMP) and inorganic solids are extracted, and a washing solution supply line, through which a washing solution is supplied, are provided (neither components are illustrated). The liquid amount of the washing solution that is supplied is preferably equal to or greater than the amount of the extracted slurry solution, from the perspective of increase in the degree of washing. The solid such as a by-product salt cleansed by the washing solution is extracted from the slurry extraction line. Then, after dissolved in water as necessary, the solid is measured for the dielectric constant or the like. The solid is then fed to analyze water and discharged.

The washing part 5 may be optionally provided with a mechanism that prevents a back flow to keep the solid from flowing backward and being discharged from the washing solution discharge port into the reaction vessel. For example, a mechanism for controlling the washing solution that the sedimentation rate of the solid is a positive value in the gravity direction may be used, and a back flow can be prevented by adjusting the liquid path area of each supply port and discharge port to control the supplied amount of the washing solution.

Examples of the static mixing mechanism 6 fixed to the cylindrical interior of the washing part 5 include an optional static mixing apparatus that repeatedly divides and merges the flows of a downward flow of the solid and an upward flow of the washing solution flowing into the cylinder, thereby mixing and stirring the mixture. As another example of the static mixing mechanism 6, a static mixer, or a mixing mechanism provided with an impact plate at a given angle on the inside surface can be suitably used. Energy consumption can be reduced by performing mixing and stirring with a static mixer without providing a dynamic stirrer. In addition, a simpler structure of a static mixing mechanism compared to that of a dynamic stirrer can reduce the burden of washing and maintenance.

A static mixer is a detachable device which constitutes the washing part, and one or more spiral-shaped twisted blades, for example, may be used. Spiral-shaped twisted blades have a structure in which a rectangular plate shape is twisted by 180 degrees. A fluid flowing into a static mixer is mixed and stirred by the spiral-shaped twisted blades. In this embodiment, a publicly known static mixer may be used, and examples of static mixers include a static mixer produced by Noritake Co., Ltd., a static mixer produced by Mercury Supply Systems, and a static mixer produced by JMS.

The size of the washing part is not particularly limited and may be set appropriately in accordance with the size of the connected reaction vessel, the amount of the solid such as a salt that may be produced as a by-product, the amount of the reaction mixture subjected to washing, and the like. For example, in a case where the amount of the by-product salt is large, the degree of washing can be increased by extending the length of the cylindrical structure and the static mixing mechanism stored inside the structure.

Next, referring to FIG. 1, the continuous production method for a polymer according to an embodiment will be described concurrently with a description of the operation of the continuous polymerization apparatus.

Continuous Production Method for Polymer

The production method includes: a supply step of supplying a polymerization solvent and reaction raw materials to at least one of a plurality of reaction vessels communicating with one another through a gas phase; a polymerization step of performing a polymerization reaction in the polymerization solvent to form a reaction mixture; a water removal step of removing at least a part of the water present in the gas phase part of the plurality of the reaction vessels; a step of successively moving the reaction mixture through each reaction vessel; and a step of separating the solid included in the reaction mixture by sedimentation and performing countercurrent washing on the reaction mixture; wherein the respective steps are performed in parallel.

The production method will be described in detail hereinafter. In the supply step, a polymerization solvent and reaction raw materials are supplied to the housing chamber 2 through the supply line 4. The raw materials and the solvent may be supplied separately from respective supply lines, or may be supplied after some or all are mixed in advanced.

In the polymerization step, the solvent and various raw materials that are supplied are first mixed in the reaction vessel 1a, and a reaction mixture 9a is formed as a result of a polymerization reaction performed in the polymerization solvent. Note that in some cases, the configuration may be adopted, in which only water removal is performed while the polymerization reaction does not essentially proceed in the reaction vessel 1*a*, and the polymerization reaction proceeds in the reaction vessel 1*b* or later.

Note that water may be added to at least one of the reaction vessels 1*a* to 1*c*. The amount of water added in such cases can be adjusted appropriately in accordance with the amount of reaction raw materials.

In the production method, at least some of the water inside the housing chamber 2 is removed from the housing chamber 2 through the gas phase in the housing chamber 2 due to the action of the water removing part 14 (details given below) through the discharge line 13 in the water removal step. As a result, at least a part of the water present in the reaction vessels 1*a* to 1*c* is removed. The water inside the housing chamber 2 may be water that is supplied to the housing chamber 2. Here, the water that is supplied to the housing chamber 2 refers to water that is intentionally supplied to the housing chamber 2 and, when water is not intentionally supplied to the housing chamber 2, typically water that is supplied to the housing chamber 2 together with the reaction raw materials while included in the raw materials. Due to the high vapor pressure of water, in a case where the water content of the gas phase of the housing chamber 2 is high, the pressure inside the housing chamber 2 tends to be high. In such a case, the housing chamber 2 must be made pressure-resistant, which makes it difficult to achieve resource conservation, equipment cost reduction, and the like. In addition, the water content is preferably reduced to a degree that does not inhibit the polymerization reaction. Removal of water in the water removing part 14 and reduction of the pressure inside the housing chamber 2, can achieve resource conservation, equipment cost reduction, and the like effectively, and the water removal reaction can be performed smoothly.

The pressure inside the housing chamber 2, which is the reaction system, can be reduced to a pressure at which the solvent that is supplied does not boil, and although the pressure differs depending on the temperature of each reaction vessel, the pressure may be reduced to a gauge pressure of around 0.3 MPa, for example, or to a gauge pressure of around 0.2 MPa. In addition, the pressure may be preferably reduced to a gauge pressure of around 0.04 MPa, to a pressurized state with a gauge pressure of around 0.0001 MPa, or to a gauge pressure of 0 MPa. Although a negative gauge pressure may also be established, a pressurized state is preferable from the perspective of the energy cost of generating a negative pressure or the reduction in the boiling point of the solvent.

As described above, the reaction vessels 1*a* to 1*c* communicate with one another through the gas phase in the housing chamber 2, and the pressure of the gas phase in the housing chamber 2 is uniform. Therefore, water is removed evenly from each of the reaction vessels 1*a* to 1*c* by the water removing part 14 in the water removal step. Accordingly, the amount of water in the reaction mixture decreases from the reaction vessel 1*a* toward the reaction vessel 1*c*, i.e. from the upstream side toward the downstream side in the movement direction of the reaction mixture. As a result, the inhibition of the reaction by water is suppressed, and the polymerization reaction is accelerated. In addition, due to the increase in the boiling point of the reaction mixture, polymerization may be carried out at a high temperature, which further accelerates the polymerization reaction. The acceleration in the polymerization reaction facilitates an increase in the temperature of the reaction mixture, which further accelerates the polymerization reaction.

As described above, in the continuous polymerization apparatus 100, each part may be disposed as described above, for example, and the temperatures of the reaction vessels 1*a* to 1*c* may be increased from the upstream side toward the downstream side in the movement direction over the entire course of performing continuous reactions. In other words, the internal temperatures of the reaction vessels 1*a* to 1*c* can be set so as to be higher from the upstream side toward the downstream side in the movement direction of the reaction mixture.

In addition, as described above, the reaction vessels 1*a* to 1*c* are connected in the order of the highest maximum liquid surface level of a liquid that can be housed by each reaction vessel. As a result, in the reaction mixture moving step, the reaction mixture can be successively moved using the difference in the maximum liquid surface level. More specifically, in a case where the reaction mixtures 9*a* and 9*b* exceed the maximum liquid surface level, the reaction mixtures may go over the respective partition walls 8*a* and 8*b*. Note that as long as the communication between the reaction vessels 1*a*, 1*b*, and 1*c* through the gas phase in the housing chamber 2 is not inhibited, the shapes of the partition walls 8*a* and 8*b* are not particularly limited, and any shape may be used. In addition, the configuration may be adopted, in which the reaction solution moves through an opening part such as a through-hole or slit (neither illustrated in the drawings) formed in the partition wall.

The solid such as a salt produced as a by-product as the polymerization reaction progresses, for example, may be present in the reaction mixture in each reaction vessel. The solid is dispersed in the solution by stirring with the stirring blade and the movement flow, and the solid successively moves past the partition walls to reach the reaction vessel 1*c* equipped with the washing part 5. Here, in the washing step of this production method, the solid dispersed in the solution is sedimented at the base of the reaction vessel 1*c* in accordance with gravity and the discharge flow from the solid recover line in the lower part of the washing part 5, and the solid, which is in a wet state or in a slurry state, moves down in the cylinder of the washing part. Meanwhile, the washing solution is supplied from the lower part toward the upper part of the washing part 5. In the static mixing mechanism 6 inside the washing part 5, the solid flowing downward and the washing solution rising upward continuously make countercurrent contact so that the reaction mixture is subjected to countercurrent washing.

The washing time can be set appropriately in accordance with the amount or the like of the solid such as a salt that may be produced as a by-product. For example, the washing time can be adjusted appropriately by extending the length of the cylindrical structure of the washing part or the static mixing mechanism 6 housed inside, or by varying the flow rate.

The solid cleansed as a result of passing through the static mixing mechanism 6 is continuously or intermittently discharged from the solid recovery line beneath the washing part 5. The discharged solid may be in a wet state or in a slurry state. On the other hand, the treated reaction product and washing solution from which the solid has been separated and removed are continuously discharged from the washing solution discharge port above the washing part 5 and recovered from the treated reaction product recovery line 7 connected to the side wall 3*b*. As a result, the polymerization reaction proceeds continuously in the reaction vessel, and the countercurrent washing and discharge of the solid such as a by-product salt can be performed continuously in the washing part. A desired polymer can be obtained by performing a purification operation and/or an additional polymerization reaction or the like as necessary on the reaction mixture recovered from the treated reaction product recovery line 7. The discharged solid may be discarded or reused directly, or may be discarded or reused after being diluted or condensed with water or the like.

Further, a molecular chain extending step of further increasing the molecular weight of the polymer may be added. The molecular chain extending step is preferably a post-polymerization step of performing an additional polymerization reaction on the treated reaction product recovered from the treated reaction product recovery line 7. An example of a post-polymerization step is a post-polymerization step using a polymerization reaction vessel such as a polymerization vessel, an extruder, or a heat treatment device. In the polymerization reaction vessel method, a reaction with a polymerization aid, a molecular chain extender, a functional group imparting agent, or the like can produce a polymer with a higher degree of polymerization, a polymer having branches or functional groups, and the like. As an extruder, a kneader capable of achieving molecular chain extension in a molten state, single-screw or multiple-screw heat kneader, or the like can be preferably used. Kneading the mixture together with a functional group imparting agent or the like as necessary can produce the desired polymer. In addition, the heat treatment in the presence of oxygen or in the presence of an inert gas in the heat treatment device can extend a molecular chain via a crosslinking/branching reaction.

In the embodiment, all of the internal temperatures of the reaction vessels 1a, 1b, and 1c are at least 140° C. In a case where the polymer to be produced is either a polyarylene sulfide (PAS), a polyaryletherketone (PAEK), or a polyethernitrile (PEN), the temperature of the supply reaction vessel to which the reaction raw materials are supplied, i.e. the reaction vessel 1a, is preferably not lower than 160° C., more preferably not lower than 170° C., and even more preferably not lower than 180° C. In a case where the polymer to be produced is an aromatic polysulfone, the temperature of the reaction vessel 1a is preferably not lower than 140° C., more preferably not lower than 150° C., and even more preferably not lower than 160° C.

In addition, in a case where the polymer to be produced is PAS, PAEK, or PEN, the internal temperatures of each of the reaction vessels other than the supply reaction vessel, i.e. the reaction vessels 1b and 1c, are preferably from 200 to 300° C., more preferably from 210 to 280° C., and even more preferably from 220 to 270° C. In a case where the polymer to be produced is an aromatic polysulfone, the internal temperatures of each of the reaction vessels 1b and 1c are preferably from 165 to 260° C., more preferably from 170 to 250° C., and even more preferably from 175 to 240° C.

Further, in a case where the polymer to be produced is PAS, the internal temperature of at least one of the reaction vessels other than the supply reaction vessel is preferably from 230 to 285° C., more preferably from 235 to 280° C., and even more preferably from 240 to 275° C. In a case where the polymer to be produced is an aromatic polysulfone, the internal temperature of at least one of the reaction vessels other than the supply reaction vessel is preferably from 170 to 260° C., more preferably from 175 to 250° C., and even more preferably from 180 to 240° C. In a case where the polymer to be produced is PAEK or PEN, the internal temperature of at least one of the reaction vessels other than the supply reaction vessel is preferably from 230 to 300° C., more preferably from 235 to 280° C., and even more preferably from 240 to 275° C.

In the embodiment, the difference between the internal temperatures of adjacent reaction vessels is preferably not less than 2° C., more preferably not less than 3° C., and even more preferably not less than 5° C. Setting the internal temperatures of the reaction vessels 1a to 1c in such a manner enables the water removal step described above to be performed primarily in the supply reaction vessel, i.e. the reaction vessel 1a, and the polymerization reaction to be performed primarily in the reaction vessel provided on the downstream side in the movement direction of the reaction mixture with respect to the reaction vessel 1a, i.e. the reaction vessel 1b. As a result, the polymerization reaction can be performed more efficiently.

In the embodiment, an inert gas is preferably fed to the gas phase in the housing chamber 2 from the gas feeding part 28 from the downstream side toward the upstream side in the movement direction of the reaction mixture, i.e. from the reaction vessel 1c toward the reaction vessel 1a. As described above, to maintain a state in which the amount of water in the reaction mixture decreases from the upstream side toward the downstream side in the movement direction of the reaction mixture, it is preferable to use a configuration in which the moisture evaporated from the reaction mixture is prevented from flowing to the downstream side and from being condensed on the reaction mixture. The inert gas is fed to the gas phase from the gas feeding part 28 as described above, and water vapor is prevented from flowing to the downstream side and being condensed on the reaction mixture.

The stirring shaft 11 is rotated by the rotary driving device 12, and the stirring blades 10a to 10c installed on the stirring shaft 11 rotate around the stirring shaft 11 accordingly. Thus, the reaction mixtures 9a to 9c are stirred. The stirring blades 10a to 10c are installed on the same stirring shaft 11. Therefore, by simply rotating the stirring shaft 11 with the rotary driving device 12, all of the stirring blades 10a to 10c can be rotated under the same conditions, and thus uniform stirring with high efficiency can be achieved. Note that in the present embodiment, a case in which the stirring shaft 11 is a single shaft is indicated. But multiple shafts such as 2 or 3 or more shafts may be used, and the rotational speed thereof may be the same or different.

In a case where the polymerization reaction is a desalting polycondensation reaction, salts such as alkali metal halides are precipitated in step with the progress of the polymerization reaction. When the salt accumulates at the base of the reaction vessel, the effective volume for proceeding a sufficient polymerization reaction decreases, which tends to cause a decrease in productivity or the like. Therefore, additional maintenance operations for removing the accumulated salt may be required. Stirring the reaction mixture with the stirring blades facilitates the dispersion of the salt in the reaction mixture, the movement of the salt to the reaction vessel 1c on the downstream side, and the discharge of the salt from the lower part of the washing part. On the other hand, excessive stirring may cause the reaction mixture to flow over the partition walls 8a and 8b and unnecessary mixing of the reaction mixture from the reaction vessel on the upstream side into the reaction vessel on the downstream side.

With the production method of this embodiment, the salt can be continuously sedimented and separated from the washing part and can be continuously subjected to countercurrent washing. Therefore, even in the case where the solution desalting polycondensation reaction may produce a large amount of the by-product salt, problems such as the reduction of the reaction space or rusting inside the apparatus can be prevented, and washing and maintenance may be easy.

In the reaction vessels not equipped with the washing part 5 (reaction vessels 1a and 1b in FIG. 1), the shape, number, rotational speed, and the like of the stirring blades are preferably adjusted appropriately such that the dispersion of the solid such as a salt can be promoted and the unnecessary immixing of the reaction mixture between reaction vessels can be avoided. Of these, the rotational rate of the stirring blades may be chosen to satisfy the condition that the solid is not sedimented. More specifically, for a given shape and number of the vessels and the stirring blades, the rotational rate is chosen to realize the stirring speed by the stirring blades being not less than the minimum stirring speed for particle flotation. Note that the upper limit of the rotational speed is preferably a speed at which the rotational speed of the stirring blades is not greater than 120 rpm and more preferably a speed at which the rotational speed of the stirring blades is not greater than 60 rpm from the perspective of easier prevention of the reaction mixture from flowing over the partition wall 8a and/or the partition wall 8b. In addition, the rotational shape of the stirring blades can be adjusted appropriately. Specifically, for the preferable shape of the stirring blades, the stirring blades pass through the vicinity of the base to prevent the solid from being sedimented.

On the other hand, in the reaction vessel equipped with the washing part 5 (reaction vessel 1c in FIG. 1), the shape, number, rotational speed, and the like of the stirring blades are preferably chosen appropriately to promote sedimentation of the solid such as a salt in the washing part. Of these, the shape of the vessels and the number of the stirring blades may be chosen to satisfy the condition that the solid is sedimented. More specifically, for a given shape of the vessels and the rotational rate of stirring blades, the shape and number of the stirring blades are chosen to realize the stirring speed by the stirring blades being not greater than the minimum stirring speed for particle flotation. Specifically, for the preferable shape of the stirring blades, the stirring blades do not pass through the vicinity of the base and promote the solid to be sedimented.

Exhaust from the housing chamber 2 is supplied to the water removing part 14 via the discharge line 13. The water removal part 14 functions as a distillation column, for example, wherein a liquid containing the polymerization solvent as a primary component is recovered from one end (for example, the lower part), and various raw materials and vapor containing water are recovered from the other end (for example, the upper part).

The polymerization solvent recovered from the water removing part 14 may be resupplied to the housing chamber 2 as a reaction raw material for the polymerization reaction after purification or the like as necessary. The supply destination of the recovered polymerization solvent may be any one of the reaction vessels 1a to 1c or may be a combination of two or more thereof.

In addition, the movement or the like of the reaction mixture is achieved by the difference in maximum liquid surface level and the sedimentation of the solid using gravity, thereby driving the continuous polymerization apparatus 100. Thus, a large amount of energy is unnecessary. The continuous polymerization apparatus 100 can easily achieve resource conservation, energy conservation, and equipment cost reduction.

Further, according to the present production method, the reaction raw materials may be supplied to at least one of the plurality of reaction vessels communicating with one another through the gas phase. Thus, complex control or the like is unnecessary, and the production of a polymer becomes easy. In addition, the removal of the solid such as a by-product salt can also be performed continuously at the same time that polymerization reaction continuously proceeds.

Note that although a continuous production method for a polymer using a specific apparatus was described in this embodiment, the production method of the present invention may further include other steps as long as at least a plurality of reaction vessels that communicate with one another through a gas phase and a washing part are used, the method includes the supply step, polymerization step, water removal step, movement step, and washing step described above, and these steps are performed in parallel.

In addition, although reaction vessels of a specific shape are used in this embodiment, the shape of the reaction vessels is not particularly limited.

Further, the number of reaction vessels in this embodiment is not particularly limited. The reaction vessels are also not necessarily connected in series as described in FIG. 1. Accordingly, some of the plurality of reaction vessels may be arranged in parallel, for example.

In addition, at least one pair of adjacent reaction vessels among the plurality of reaction vessels is such that the reaction vessel with the higher maximum liquid surface level of a liquid that can be housed by each reaction vessel is positioned on the upstream side in the direction in which the reaction mixture moves, and the reaction mixture preferably moves using the difference in maximum liquid surface level. As a result, the movement of the reaction mixture is achieved using gravity in the at least one pair of reaction vessels. Thus, resource conservation, energy conservation, equipment cost reduction, and the like can be achieved.

Further, in this embodiment, the feeding step of feeding an inert gas is preferably performed in parallel with each of the steps described above. In addition, the separation and recover step of separating and recovering some of the reaction raw materials and the resupply step of supplying at least some of the raw materials to at least one of the reaction vessels are preferably performed in parallel with the steps described above.

Moreover, although a configuration in which the reaction raw materials are supplied to the reaction vessel 1a was described in this embodiment, the reaction vessel to which the reaction raw materials are fed is not specified.

Embodiment 2

Figure 2:
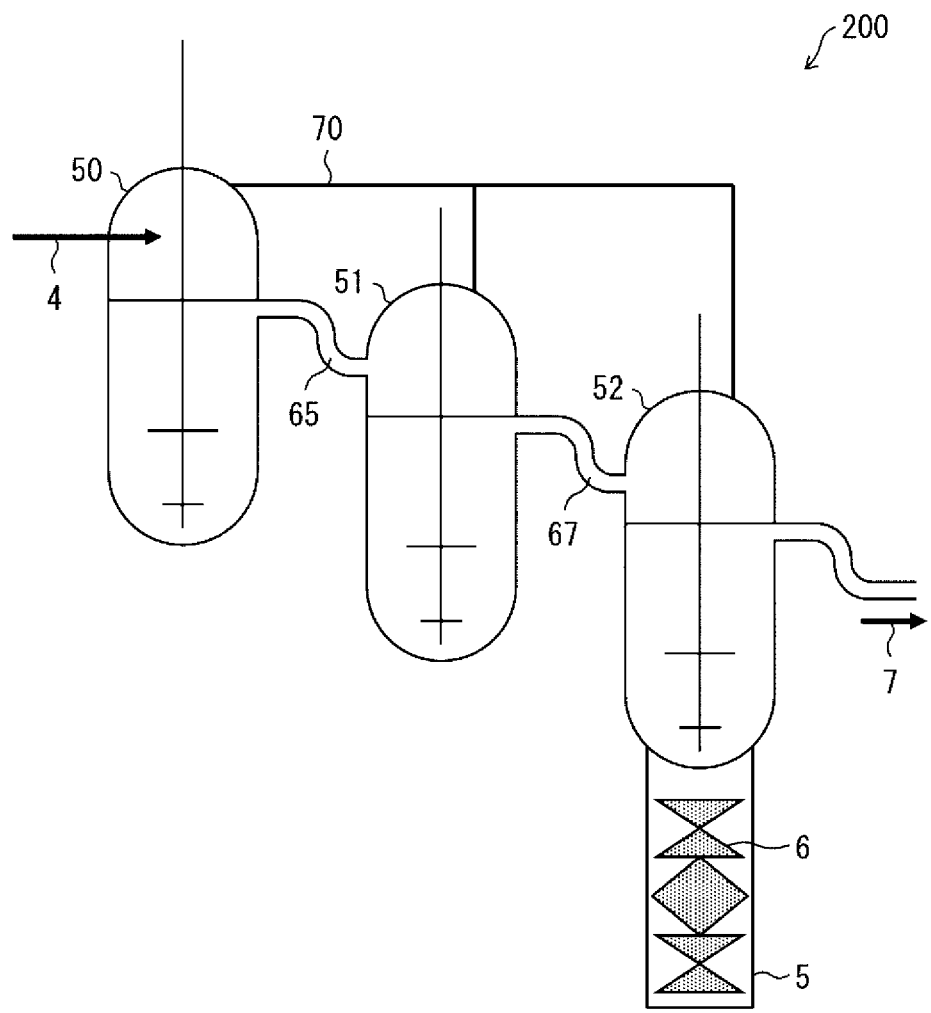
FIG. 2 is a partial cross-sectional view illustrating another embodiment of the continuous polymerization apparatus according to the present invention.

Next, another example of a continuous polymerization apparatus will be described using FIG. 2. FIG. 2 schematically illustrates another example of the configuration of a continuous polymerization apparatus.

Referring to FIG. 2, a continuous polymerization apparatus 200 includes a first reaction vessel 50, a second reaction vessel 51, and a third reaction vessel 52. The second reaction vessel 51 is disposed below the first reaction vessel 50 in the vertical direction, and the third reaction vessel 52 is disposed below the second reaction vessel 51 in the vertical direction.

The first and second reaction vessels 50 and 51 are connected by a first pipe 65. In addition, the second and third reaction vessels 51 and 52 are connected by a second pipe 67.

A washing part 5 having the same configuration as that of Embodiment 1 described above is provided at the base of the third reaction vessel 52.

A polymerization solvent and reaction raw materials are supplied from a supply line 4 to the first reaction vessel 50, and the first pipe 65 is provided such that in a case where the reaction mixture in the first reaction vessel 50 exceeds the maximum liquid surface level, the reaction mixture moves through the first pipe 65 to the second reaction vessel 51. In addition, the second pipe 67 is provided such that in a case where the reaction mixture in the second reaction vessel 51 exceeds the maximum liquid surface level, the reaction mixture moves through the second pipe 67 to the third reaction vessel 52. The solid is discharged by sedimentation from the lower part of the washing part at the base of the third reaction vessel 52, and the cleansed reaction mixture and washing solution are recovered from a treated reaction product recovery line 7.

A ventilation part 70 is connected to each of the first through third reaction vessels 50 to 52. The first through third reaction vessels 50 to 52 communicate through the ventilation part 70 through a gas phase.

With the configuration of such a continuous polymerization apparatus 200, the same effect as in Embodiment 1 can be achieved by successively moving the reaction mixture using the difference in maximum liquid surface level of each of the first and second reaction vessels 50 and 51. Further, with the continuous polymerization apparatus 200, it is unnecessary to provide partition walls as illustrated in Embodiment 1.

Similar to Embodiment 1, the continuous polymerization apparatus according to Embodiment 2 described above may further include a molecular chain extending part for further increasing the molecular weight of the polymer. The molecular chain extending part is preferably a post-polymerization part configured to perform an additional polymerization reaction on the treated reaction product recovered from the treated reaction product recovery line 7. An example of a post-polymerization part is a post-polymerization part using a polymerization reaction vessel such as a polymerization vessel, an extruder, or a heat treatment device. In the polymerization reaction vessel method, a reaction of the mixture together with a polymerization aid and a molecular chain extender or a functional group imparting agent, which are raw materials of an additional polymerization reaction. a polymer or the like with a higher degree of polymerization can produce a polymer having branches or functional groups, and the like. As an extruder, a kneader capable of achieving molecular chain extension in a molten state, single-screw or multiple-screw heat kneader, or the like can be preferably used. Kneading the mixture together with a functional group imparting agent or the like as necessary can produce the desired polymer. In addition, the heat treatment in the presence of oxygen or in the presence of an inert gas in the heat treatment device can extend a molecular chain via a crosslinking/branching reaction.

Embodiment 3

Figure 3:
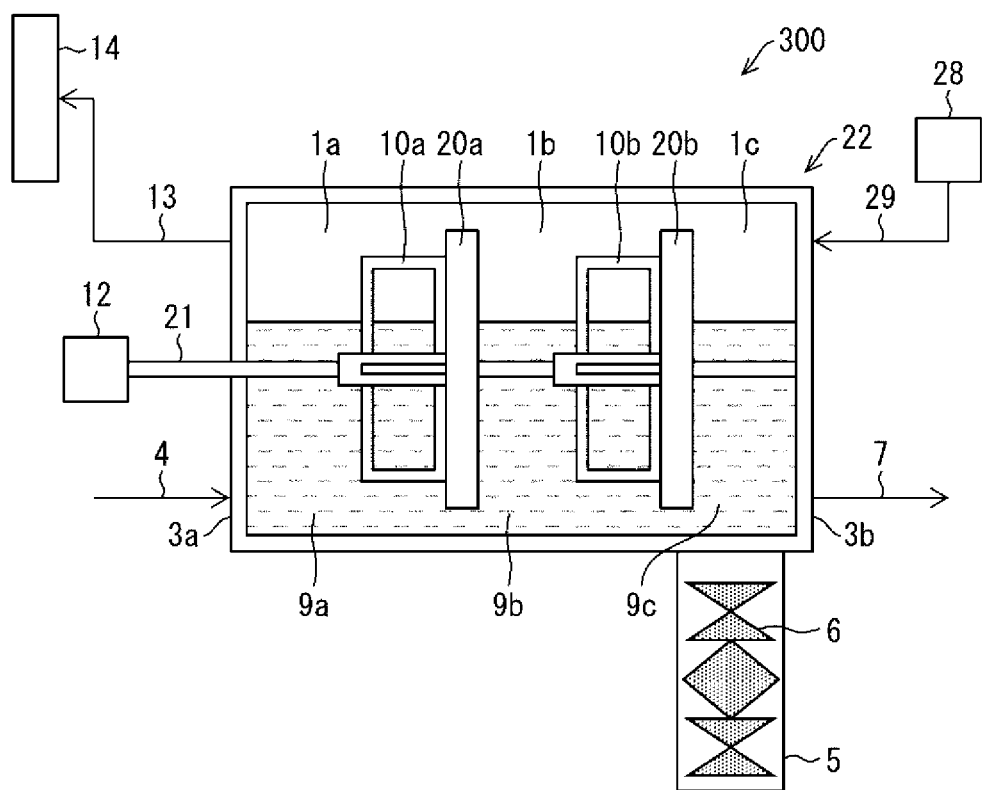
FIG. 3 is a partial cross-sectional view illustrating another embodiment of the continuous polymerization apparatus according to the present invention.

Yet another example of a continuous polymerization apparatus will be described using FIG. 3. FIG. 3 schematically illustrates another example of the configuration of a continuous polymerization apparatus.

Referring to FIG. 3, a continuous polymerization apparatus 300 differs from Embodiment 1 in that inside a housing chamber 22 of Embodiment 1, the isolating means for isolating the reaction vessels is not a partition wall, but rather a partition plate having a rotational center.

In this embodiment, the reaction vessel 1a and the reaction vessel 1b are separated by a partition plate 20a, and reaction vessel 1b and the reaction vessel 1c are separated by a partition plate 20b. The reaction vessels 1a, 1b, and 1c communicate with one another through a gas phase part in the housing chamber 22.

In addition, a stirring blade 10a for stirring a reaction mixture 9a in the reaction vessel 1a is attached to one side of the partition plate 20a. Similarly, a stirring blade 10b for stirring a reaction mixture 9b in the reaction vessel 1b is attached to one side of the partition plate 20b. Note that in contrast to the stirring blades 10a and 10b in the embodiment described above, the stirring blades 10a and 10b in this embodiment have a structure in which an opening is provided on the inside.

The stirring blades 10a and 10b and the partition plates 20a and 20b are all installed on the same rotation shaft 21. The rotation shaft 21 installed to pass through the side wall 3a from outside the housing chamber 22 and to reach the side wall 3b. A rotary driving device 12 for rotating the rotation shaft 21 is installed at the end of the rotation shaft 21 on the side wall 3a side.

Note that the stirring blades can be installed at any position with respect to the partition plates. The partition plates may be on the upstream side or the lower side of the stirring blades, or there may be a combination thereof. The partition plates may be distanced from the stirring blades, but, preferably, may be in contact with and connected to the partition plates as illustrated in FIG. 3, to fix and reinforce the partition plates. The stirring blades and partition plates do not necessarily need to be provided in pairs, and there may be areas in which there is no stirring blade between the adjacent partition plates. Providing at least one stirring blade may assist the progress of the polymerization reaction and ensure the smooth movement of the solid in the reaction mixture. Alternatively, the stirring blades may not be provided, which makes it possible to achieve an even simpler apparatus configuration.

The shape of the partition plates is not particularly limited and may be any shape which has a rotational center, and partially blocks a vertical cross-sectional surface in the housing chamber 22, but provides clearance or openings of a prescribed width simultaneously to allow the adjacent reaction vessels to communicate with one another. For example, in a case where the housing chamber 22 is a hollow cylindrical shape, as illustrated in FIG. 3, the partition plates may have a disc-like shape with a radius that is a size smaller than the internal space of the housing chamber. Note that the shape of the partition plates is not limited to such a shape, and may not have a central axis. In a case where the partition plates do not have a central axis, a plurality of partition plates may form a basket-like rotating body by coupling the adjacent partition plates via a mesh-like member, for example. The basket-like rotating body is provided with a rotation shaft on the outer partition plate (partition plate positioned closest to the side wall 3b side), and rotating the rotation shaft can rotate each partition plate even without a rotation axis in the inside partition plate.

The number of partition plates provided on the rotation shaft may be any number greater than or equal to 1 in accordance with the size of the housing chamber, the type of the polymerization reaction, and the like.

In a case where two or more partition plates are provided, the shapes thereof may be the same or different.

Providing one or more partition plates having a rotational center in the housing chamber facilitates easy washing and maintenance with a small number of man-hours, due to a hollow simple structure of the housing chamber after a partition plate is pulled out of the housing chamber when performing maintenance on the apparatus.

In addition, the position of each partition plate is not particularly limited. And the partitions may be provided at any positions.

On the other hand, the shape of the stirring blades is not particularly limited and may be any shape, wherein the stirring blade may be provided coaxially with the partition plates to stir the reaction mixture. As illustrated in FIG. 3, the stirring blades 10 may be attached to either side of the partition plate 20 or may be attached to both sides. The stirring blades may also be attached to the rotation shaft 21 separately from the partition plates.

In the reaction vessels 1a to 1c, the liquid phase parts communicate with one another. As a result, the raw materials and solvent supplied to the reaction vessel 1a, as a reaction mixture, successively move to the reaction vessels 1b and 1c while proceeding the polymerization reaction.

A washing part 5 having the same configuration as that of Embodiment 1 described above is provided at the base of the reaction vessel 1c.

The reaction mixture successively moves through the reaction vessels. The solid in the reaction mixture is discharged from the lower part of the washing part by sedimentation at the base of the reaction vessel 1c, and the cleansed reaction mixture and washing solution are recovered from the treated reaction product recovery line 7.

The solid such as a salt precipitated by the reaction in each of the reaction vessels does not accumulate at the base of the reaction vessel, but rather moves in the downstream direction together with the reaction mixture and is discharged from the washing part. Accordingly, a reduction in the reaction space of the reaction vessels can be prevented.

In addition, the gas phase parts of the reaction vessels 1a to 1c communicate with one another. As a result, the pressure of the gas phase in the housing chamber 22 is uniform. The evaporated components generated at the time of polymerization in each of the reaction vessels successively move from the reaction vessel 1c to 1b and 1a through the gas phase part due to the temperature difference or the like in the apparatus, and discharged from the discharge line 13.

In the continuous polymerization apparatus 300 in the present embodiment, a clearance of a prescribed width exists between the inner wall of the housing chamber 22 and each of the outer edges of the partition plates 20a to 20b. Thus, the gas phase parts and the liquid phase parts of adjacent reaction vessels respectively communicate with one another, and the reaction mixture, gas containing evaporation components, and the like move across the reaction vessels. Openings such as through-holes or slits, for example, may be provided in the partition plates instead of providing a clearance to allow the reaction vessels to communicate through the openings. Alternatively, both a clearance and opening parts may be provided. Alternatively, the partition plates may have a mesh shape with a plurality of fine through-holes.

The width of the clearance or the size of the opening parts is not particularly limited and may be set appropriately in accordance with the shape of the vessel, the shape and number of partition plates, and the like.

With the exception of the points described above, Embodiment 3 is as described in Embodiment 1.

Embodiment 4

Next, yet another embodiment of the present invention will be described in detail.

In the continuous production apparatus (not illustrated) according to the present embodiment, a plurality of reaction vessels are disposed adjacently in the vertical direction inside a housing chamber. The adjacent reaction vessels are separated by fixed partition plates without gaps and configured to allow a reaction mixture to move successively through a connection pipe from a reaction vessel on the upper side to a reaction vessel on the lower side. In addition, the gas phase part of each reaction vessel communicates with one another by a communication pipe. Therefore, the pressure of the gas phase of each reaction vessel in the housing chamber is roughly the same. The communication pipe connecting the gas phase parts may be the same as the connection pipe though which the reaction mixture moves successively, or may be a pipe provided separately from the connection pipe. Here, a case in which a first reaction vessel and a second reaction vessel are provided sequentially from the upper side in the vertical direction will be described in detail as an example. The first and second reaction vessels communicate through a first connection pipe, and the pipe wall of the first connection pipe projects toward the first reaction vessel side. The height of the pipe wall of the first connection pipe is equal to the maximum liquid surface level of a liquid that can be housed in the first reaction vessel. The first connection pipe passes through a first partition plate which separates the first and second reaction vessels.

In a continuous production apparatus with such a configuration, in a case where the reaction mixture exceeds the maximum liquid surface level of the first reaction vessel, the reaction mixture flows over the pipe wall of the first connection pipe and into the first connection pipe. The reaction mixture then flows into the second reaction vessel through the first connection pipe. Such a continuous production apparatus may be configured to allow the reaction mixture to move successively.

In addition, in the first and second reaction vessels, the gas phase part of the first reaction vessel communicates with the gas phase part of the second reaction vessel through a connection pipe or a communication pipe.

A washing part is preferably provided at the base of a lower reaction vessel and is more preferably provided at the base of the lowest reaction vessel.

In a case where a washing part is provided at the base of the lowest reaction vessel, the reaction mixture successively moves through the reaction vessels. The solid in the reaction mixture is discharged from the lower part of the washing part by sedimentation at the base of the lowest reaction vessel, and the cleansed reaction mixture and washing solution are recovered from the treated reaction product recovery line.

The solid such as a salt precipitated by the reaction in each of the reaction vessels does not accumulate at the base of the reaction vessel, but moves in the downstream direction together with the reaction mixture and is discharged from the washing part. Thus, a reduction in the reaction space of the reaction vessels can be prevented.

In a continuous production apparatus with such a configuration, in a case where the height of the reaction mixture exceeds the maximum liquid surface level of the first reaction vessel, the reaction mixture flows over the pipe wall of the first connection pipe and into the first connection pipe. The reaction mixture then flows into the second reaction vessel through the first connection pipe. Such a continuous production apparatus may be configured to allow the reaction mixture to move successively.

In addition, in the first and second reaction vessels, the gas phase part of the first reaction vessel communicates with the gas phase part of the second reaction vessel through a connection pipe or a communication pipe.

In the present invention, the recovery rate (recovered amount/theoretically produced amount) of the by-product salt that is separated, washed, and recovered by the washing part is ordinarily not less than 20%, preferably not less than 30%, and more preferably not less than 40%. Here, the theoretically produced amount of the by-product salt is the amount of the by-product salt produced when the conversion ratio of all monomer raw materials used in the desalting polycondensation reaction reaches 100%.

In the present invention, the purity of the by-product salt that is separated, washed, and recovered by the washing part is ordinarily not less than 80%, preferably not less than 90%, and more preferably not less than 93%.

In the case of an aromatic polythioether in the present invention, the content of a sulfur source present in the by-product salt that is separated, washed, and recovered by the washing part is ordinarily not greater than 10 mass % and preferably not greater than 8 mass %.

The continuous polymerization apparatuses according to Embodiments 1 to 4 can be used in the continuous production of various polymers obtained by solution desalting polycondensation. Examples of such polymers include aromatic polymers containing at least one type of heteroatom selected from the group consisting of sulfur, nitrogen, and oxygen.

Specifically, examples of such polymers include aromatic polythioethers having thioether bonds, which are bonds between an aromatic ring and sulfur, and aromatic polyethers having ether bonds, which are bonds between an aromatic ring and oxygen. In a case where both of these bonds coexist in a polymer, the polymer is classified as the aromatic polymers corresponding to the bond with the higher molar content ratio.

Specific examples of aromatic polythioethers are polyarylene sulfides (PAS), and more specifically include polyphenylene sulfide (PPS), polyphenylene sulfide ketone (PPSK), polyphenylene sulfide ketone ketone (PPSKK), polyphenylene sulfide sulfone (PPSS), and polyphenylene sulfide ketone sulfone (PPSKS).

In addition to aromatic polymers containing aromatic rings and ether bonds, aromatic polyethers also include aromatic polymers containing at least one group selected from groups including sulfone groups, ketone groups, and nitrogen in addition to these groups. Examples include aromatic polysulfones such as polysulfone (PSU), polyphenyl sulfone (PPSU), and polyether sulfone (PES), which have a sulfone group in addition to the groups described above. Additional examples include polyaryl ether ketones (PAEK), which has ketone groups in addition to an aromatic ring and an ether bond. Specific examples include polyether ether ketone (PEEK), polyether ketone (PEK), polyether ketone ketone (PEKK), polyether ether ketone ketone (PEEKK), and polyether ketone ether ketone ketone (PEKEKK). Examples of aromatic polymers containing a nitrogen atom include aromatic polymers in which a group containing nitrogen bonds with an aromatic ring in addition to aromatic rings and ether bonds. Specific examples include polyether nitriles (PEN) having a nitrile group.

In the above descriptions, a case in which a plurality of the above groups coexist in the polymer is classified as an aromatic polymer corresponding to the group with the highest molar content ratio.

Of these, from the perspective of ease of production with the method of the present invention, aromatic polythioethers and aromatic polyethers are preferable, and polyarylene sulfide, aromatic polysulfone, polyaryl ether ketone, and polyether nitrile are more preferable.

An embodiment of a case in which the polymer to be produced is polyarylene sulfide (PAS) will be described hereinafter.

Specifically, in the supply step, an organic polar solvent serving as a polymerization solvent, at least one type of sulfur source selected from the group consisting of alkali metal sulfides, alkali metal hydrosulfides, and hydrogen sulfide serving as a reaction raw material, and a dihalo aromatic compound as a reaction raw material are respectively supplied through the supply line. Some or all of the reaction raw materials may be supplied to the housing chamber after being mixed in advance. For example, a mixture of an organic polar solvent and a dihalo aromatic compound or a mixture of an organic polar solvent and a sulfur source may be prepared in advance, and this mixture may be supplied to the housing chamber. In addition, the mixture may be supplied after being heated, supplied after being heated and reacted, or supplied after being reacted without being heated.

In the polymerization step, the supplied organic polar solvent, sulfur source, and dihalo aromatic compound as well as other reaction raw materials that may be optionally used are first mixed in a reaction vessel, and the sulfur source and the dihalo aromatic compound are subjected to a polymerization reaction in the organic polar solvent to form a reaction mixture.

Substances ordinarily used in the production of PAS may be used as the organic polar solvent, the at least one type of sulfur source selected from the group consisting of alkali metal sulfides, alkali hydrosulfides, and hydrogen sulfide, and the dihalo aromatic compound.

The organic amide solvents, aprotic organic polar solvents containing an organic sulfur compound, or aprotic polar solvents containing a cyclic organic phosphorus compound described above can be used as an organic polar solvent. A polymerization solvent selected from the group consisting of N-alkylcaprolactam compounds such as N-methyl-ε-caprolactam; N-alkylpyrrolidone compounds or N-cycloalkylpyrrolidone compounds such as N-methyl-2-pyrrolidone (NMP), N-ethyl-2-pyrrolidone, and N-cyclohexyl-2-pyrrolidone; N,N-dialkylimidazolidinone compounds such as 1,3-dialkyl-2-imidazolidinone; and mixtures thereof is preferable, an N-alkylpyrrolidone compound is more preferable, and NMP is particularly preferable.

Examples of sulfur sources include alkali metal sulfides, alkali metal hydrosulfides, and hydrogen sulfide. From the perspectives of ease of handling and low cost, alkali metal sulfides and alkali metal hydrosulfides are preferable as sulfur sources. The sulfur source is preferably in an aqueous solution state from the perspective of handling in the state of an aqueous slurry or an aqueous solution and from the perspective of handling in terms of measurability, transportability, and the like.

Examples of alkali metal sulfides include lithium sulfide, sodium sulfide, potassium sulfide, rubidium sulfide, and cesium sulfide.

Examples of alkali metal hydrosulfides include lithium hydrosulfide, sodium hydrosulfide, potassium hydrosulfide, rubidium hydrosulfide, and cesium hydrosulfide.

In a case where an alkali metal hydrosulfide or hydrogen sulfide is used as a sulfur source, an alkali metal hydroxide may be used in combination. Examples of alkali metal hydroxides include lithium hydroxide, sodium hydroxide, potassium hydroxide, rubidium hydroxide, cesium hydroxide, and mixtures of two or more types thereof. Of these, sodium hydroxide and lithium hydroxide are preferable due to industrial scale availability at low cost. In addition, the sulfur source is preferably in the form of an aqueous solution or a slurry from the perspective of handling.

In a case where any of the alkali metal sulfide, the alkali metal hydrosulfide, and the hydrogen sulfide are mixed and used, the mixture becomes a sulfur source.

Examples of dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. The halogen atoms in the dihalo aromatic compound may be, for example, fluorine, chlorine, bromine, or iodine. Two halogen atoms in the dihalo aromatic compound may be the same or different. As a dihalo aromatic compound, p-dihalobenzene, m-dihalobenzene, and mixtures thereof are preferable, p-dihalobenzene is more preferable, and p-dichlorobenzene (pDCB) is particularly preferable.

Any alkali metal sulfides, alkali metal hydrosulfides, and dihalo aromatic compounds may be used alone, or two or more types thereof may be mixed and used as long at the combination can produce PAS.

The polymerization reaction may be performed using a polymerization aid. Specific examples of such a polymerization aid include organic carboxylic acid metal salts, organic sulfonic acid metal salts, lithium halide, sulfuric acid alkali metal salts, alkali earth metal oxides, alkali metal phosphates, and alkali earth metal phosphates. These may be used alone, or two or more types thereof may be used simultaneously. Of these, an organic carboxylic acid metal salt or lithium halide is preferably used. More specific examples include lithium acetate, sodium acetate, potassium acetate, sodium propionate, lithium benzoate, sodium benzoate, sodium phenylacetate, sodium p-tolulate, and lithium halide. Of these, lithium acetate or sodium acetate is preferably used, and sodium acetate is more preferably used in that it can be procured inexpensively. These polymerization aids may be used alone, or two or more types thereof may be mixed and used as long as the combination can produce PAS.

An embodiment of a case in which the polymer to be produced is an aromatic polysulfone will be described hereinafter.

An aromatic polysulfone can be produced by performing a polycondensation reaction on an aromatic dihalogenosulfone compound and an aromatic dihydroxy compound in the presence of a base and a polymerization solvent. In the present invention, an aromatic polysulfone is typically a resin having repeating units of a divalent aromatic group (residue formed by removing, from an aromatic compound, two hydrogen atoms bonded to the aromatic ring thereof), a sulfonyl group (—SO$_2$—), and an oxygen atom. The aromatic polysulfone can be produced, for example, using the raw materials described in JP 2013-159641 A.

That is, the aromatic dihalogenosulfone compound and the aromatic dihydroxy compound correspond to repeating units constituting an aromatic polysulfone. Aromatic dihalogenosulfone compound may be a compound including an aromatic ring, a sulfonyl group (—SO$_2$—), and two halogen atoms in each molecule. In addition, the aromatic dihydroxy compound may be a compound including an aromatic ring and two hydroxyl groups in each molecule.

Examples of aromatic dihalogenosulfone compounds include bis(4-chlorophenyl)sulfone and 4,4'-bis(4-chlorophenylsulfonyl)biphenyl.

Examples of aromatic dihydroxy compounds include bis(4-hydroxyphenyl)sulfone, bis(4-hydroxy-3,5-dimethylphenyl)sulfone, bis(4-hydroxy-3-phenylphenyl)sulfone, 2,2-bis(4-hydroxyphenyl)propane, 2,2-bis(4-hydroxyphenyl)hexafluoropropane, bis(4-hydroxyphenyl)sulfide, bis(4-hydroxy-3-methylphenyl) sulfide, bis(4-hydroxyphenyl) ether, hydroquinone, resorcin, catechol, phenyl hydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl, and 4,4'-dihydroxy-p-quarter-phenyl. In the present invention, a compound containing a halogeno group and a hydroxyl group in the molecule such as 4-hydroxy-4'-(4-chlorophenylsulfonyl)biphenyl is preferably used instead of all or part of the aromatic dihalogenosulfone compound and the aromatic dihydroxy compound.

In the present invention, one type of either an aromatic dihalogenosulfone compound or an aromatic dihydroxy compound may be used alone, or two or more types may be used in combination in accordance with the type of the target aromatic polysulfone.

The base may be any base capable of activating the hydroxyl group of the aromatic dihydroxy compound. Of these, the base is preferably an alkali metal salt and more preferably an alkali metal salt of carbonic acid.

The alkali metal salt of carbonic acid may be alkaline carbonate, which is a normal salt, an alkaline bicarbonate (alkaline hydrogen carbonate), which is an acidic salt, or a mixture of a normal salt and an acidic salt. Sodium carbonate or potassium carbonate is preferable as an alkaline carbonate, and sodium bicarbonate or potassium bicarbonate is preferable as an alkaline bicarbonate.

In the present invention, one type of a base may be used alone, or two or more types thereof may be used in combination. Combinations of bases are not particularly limited and may be set appropriately in accordance with the objective.

The organic amide solvents, aprotic organic polar solvents containing an organic sulfur compound, or aprotic polymerization solvents containing a cyclic organic phosphorus compound can be used as a polarization solvent of an aromatic polysulfone. A polymerization solvent selected from the group consisting of dimethylsulfoxide, sulfolane, diphenyl sulfone, N-alkyl-2-pyrrolidone, N,N'-dialkylimidazolidinone, N-alkylcaprolactam, and mixtures thereof is preferable. In particular, a polymerization solvent selected from the group consisting of sulfolane, N-ethyl-2-pyrrolidone, and N-methyl-2-pyrrolidone is preferably used.

In the polycondensation reaction, the molar ratio is adjusted so that the prescribed molecular weight can be controlled easily.

In the present invention, when performing a polycondensation reaction, one or more types of bases with a valence of n (where n is an integer of 1 or greater) may be compounded, and the number of moles of the base with respect to 1 mol of the aromatic dihydroxy compound may be adjusted so that the sum of the values of the moles of the base multiplied by n/2 times for each base type is preferably from 0.95 to 1.15 and more preferably from 1.00 to 1.10. Here, n is 2 in a case where the base is potassium carbonate and is 1 in a case where the base is potassium bicarbonate.

An embodiment of a case in which the polymer to be produced is polyaryl ether ketone (PAEK) will be described hereinafter.

PAEK is not particularly limited and has a structure including repeating units containing a divalent aromatic group (residue formed by removing, from an aromatic compound, two hydrogen atoms bonded to the aromatic ring thereof), a carbonyl bond, and an ether bond.

In the production of PAEK in the present invention, the polymerization solvents or raw material monomers described in JP 61-10486B, JP 7-138360A, WO 2003-050163, JP 2010-70657A, and JP 2014-532109T, for example, may be used.

That is, aromatic dihalide compounds and aromatic dihydroxy compounds are used as known raw material monomers. In the polymerization solvent, the raw material monomers are subjected to desalting polycondensation together with an alkali metal carboxylic acid salt, an alkali metal hydrogen carbonate salt, or an alkali metal hydroxide, which is a basic alkali metal compound capable of forming a phenolate-type salt with the aromatic dihydroxy compound to produce PAEK.

Examples of aromatic dihalide compounds include but are not limited to 4,4'-difluorobenzophenone and 4,4'-dichlorobenzophenone.

Examples of aromatic dihydroxy compounds include but are not limited to 1,3-hydroxybenzene (resorcin), 1,4-dihydroxybenzene (hydroquinone), 4,4'-dihydroxybiphenyl (4,4'-biphenol), 4,4'-dihydroxyterphenyl, 2,6-dihydroxynaphthalene, 1,4-dihydroxynaphthalene, 4,4'-dihydroxydiphenylether, 4,4'-dihydroxydiphenylsulfone, 4,4'-dihydroxybenzophenone, 4,4'-tetraphenyl bisphenol, and various other diphenols such as bisphenol A, for example, can also be used.

The organic amide solvents, aprotic organic polar solvents containing an organic sulfur compound, or aprotic polymerization solvents containing a cyclic organic phosphorus compound can be used as a polymerization solvent of PAEK. A polymerization solvent selected from the group consisting of dimethylsulfoxide, sulfolane, diphenyl sulfone, N-alkyl-2-pyrrolidone, N,N'-dialkylimidazolidinone, N-alkylcaprolactam, and mixtures thereof is preferable. In particular, N-alkyl-2-pyrrolidones, particularly N-methyl-2-pyrrolidone, is preferably used.

When recovering the PAEK reaction mixture, the mixture is preferably recovered in a slurry state by controlling the mass ratio of raw material monomers with respect to the polymerization solvent. The mass ratio of the raw material monomers/polymerization solvent is ordinarily from 1 to 25 parts by mass, preferably from 3 to 20 parts by mass, and even more preferably from 5 to 15 parts by mass of raw material monomers per 100 parts by mass of the polymerization solvent. The solvent may be supplied to the reaction mixture at some time between during the polymerization reaction and the recovery, preferably between the end of the polymerization reaction and the recovery, to control the mass ratio of the raw material monomers/polymerization solvent to be within the range described above. Controlling the mass ratio of the raw material monomers with respect to the polymerization solvent to within the range described above can solve the known problem of the solidification of the reaction mixture during the recovery of the reaction mixture. In addition, the washing of the polymer and the recovery or recycling of the solvent or the like become easy.

The alkali metal salt used in the production of PAEK is preferably a solid powder having a fine particle size from the perspectives of supply properties and reactivity. Specifically, the average particle size of the alkali metal salt is preferably not greater than 95 µm, more preferably from 5 to 80 µm, even more preferably from 7 to 60 µm, and particularly preferably from 10 to 30 µm. In this specification, the average particle size refers to the mass average particle diameter and can be determined easily using an analyzer for particle analysis. In addition, such an average particle size can be obtained by using a typical pulverization method such as a homogenizer or an impact mill.

An embodiment of a case in which the polymer to be produced is polyether nitrile (PEN) will be described hereinafter.

PEN is not particularly limited and has a structure including repeating units containing a divalent aromatic group to which a cyano group is bonded (residue formed by removing, from an aromatic compound to which a cyano group is bonded, two hydrogen atoms bonded to the aromatic ring thereof) and an ether bond.

PEN is obtained, for example, with the method described in JP 7-138360A.

That is, for PEN, aromatic dihalide compounds and aromatic dihydroxy compounds are used as known raw material monomers. In the polymerization solvent, the raw material monomers are subjected to desalting polycondensation together with an alkali metal carboxylic acid salt, an alkali metal hydrogen carbonate salt, or an alkali metal hydroxide, which is a basic alkali metal compound capable of forming a phenolate-type salt with the aromatic dihydroxy compound to produce PAEK.

Examples of aromatic dihalide compounds include but are not limited to 2,6-difluorobenzonitrile, 2,6-dichlorobenzonitrile, 2,4-difluorobenzonitrile, and 2,4-dichlorobenzonitrile.

An alkali metal compound of PEN modifies the aromatic hydroxy compound used in the reaction to an alkali metal salt. Examples of alkali metal compounds include carbonic acid salts, bicarbonates, or hydroxides of lithium, sodium, potassium, rubidium, or cesium. Of these, sodium or potassium compounds are ordinarily preferable as alkali metal compounds, or carbonic acid salts of alkali metals may also be preferable. That is, sodium carbonate and potassium carbonate are particularly preferable as alkali metal compounds. One type of these alkali metal compounds may be used alone, or two or more types thereof may be combined and used or used as a mixture as necessary. The appropriate amount of the alkali metal compound used is typically selected within the range of from 1.01 to 2.5 equivalents per 1 equivalent of the aromatic dihydroxy compound that is used. Note that, for both an aromatic dihydroxy compound and an alkali metal carbonic acid salt, 1 mol corresponds to 2 equivalents, whereas, for both an alkali metal bicarbonate and hydroxide, 1 mol corresponds to 1 equivalent.

The organic amide solvents, aprotic organic polar solvents containing an organic sulfur compound, or aprotic polymerization solvents containing a cyclic organic phosphorus compound can be used as a polymerrization solvent of PEN. A polymerization solvent selected from the group consisting of dimethylsulfoxide, sulfolane, N-alkyl-2-pyrrolidone, N,N'-dialkylimidazolidinone, N-alkylcaprolactam, and mixtures thereof is preferable. In particular, of N-alkyl-2-pyrrolidones, N-methyl-2-pyrrolidone is preferably used.

In PEN, the alkali metal salt used in the production of the aromatic polymer is the same as when PAEK is produced.

The polymer liquid obtained by the continuous production method for a polymer according to the present invention is obtained in a form containing from 0.1 to 5 mass % of a salt produced by a desalting polycondensation reaction with respect to the mass of the polymer. The amount of the salt is preferably from 0.1 to 3 mass %, more preferably from 0.1 to 2 mass %, and particularly preferably from 0.1 to less than 1 mass %. Accordingly, the polymer liquid of the present invention can be effectively used as it is or as a composition with other materials. Note that in this specification, the polymer liquid is the reaction mixture described above. Polymer liquids include polymer solutions and polymer slurries.

For example, using the polymer liquid of the present invention, a useful composition can be produced easily and inexpensively with one or more types selected from the group consisting of aromatic polythioethers, aromatic polysulfones, aromatic polyether ketones, aromatic polyether nitriles (PEN), liquid crystal polymers, polyimides, polyphenylene ethers, polyether imides, polyamide imides, aromatic polyesters, syndiotactic polystyrenes, polyamides, and fluororesins.

In addition, a composition containing the polymer liquid of the present invention and one or more types of polymers differing from the polymer contained in the polymer liquid can also form a useful polymer alloy and, in particular, a nanocomposite. The composition can be obtained, for example, by mixing the polymer liquid of the present invention and a polymer differing from the polymer contained in the polymer liquid.

Further, in addition to the polymer liquid obtained by the continuous production method for a polymer according to the present invention, the composition may also contain additives such as fiber fillers or inorganic fillers. Examples of fiber fillers include glass fibers, carbon fibers, and nanofibers. Examples of inorganic fillers include silica, quartz powder, silicates such as calcium silicate, aluminum silicate, kaolin, talc, clay, diatomaceous earth, and wollastonite, and nanoparticles thereof. Other additives that may be included in the composition include additives that may be added to enhance the properties and processability, such as pigments, lubricants, antioxidants, stabilizers, surfactants and fluidity enhancers.

In addition, an embodiment of the present invention provides a production method for a composition including a plurality of polymers, and the method includes:

(a) supplying a polymerization solvent and a reaction raw material to a continuous polymerization apparatus including a plurality of reaction vessels;

(b) performing a polymerization reaction in the polymerization solvent inside at least one of the reaction vessels to form a reaction mixture;

(c) removing at least a part of water in a gas phase part of the reaction vessel from the reaction vessel;

(d) successively moving the reaction mixture through each reaction vessel; and (e) separating a solid included in the reaction mixture by sedimentation and performing countercurrent washing;

steps (a), (b), (c), (d) and (e) being performed in parallel;

wherein the respective gas phase parts of the plurality of reaction vessels communicate with one another; and the method further includes (f) mixing a reaction mixture from which the solid has been removed and a polymer that is different from the polymer included in the reaction mixture.

The present invention is not limited to the embodiments described above, and various modifications are possible within the scope indicated in the claims. Embodiments obtained by appropriately combining the technical means disclosed by the embodiments are also included in the technical scope of the present invention.

SUMMARY

The continuous polymerization apparatus according to an embodiment of the present invention includes a plurality of reaction vessels, wherein the plurality of reaction vessels are configured such that a reaction mixture successively moves through each reaction vessel; in the plurality of reaction vessels, gas phase parts formed above the reaction mixture communicate with one another; and the continuous polymerization apparatus includes a washing part, the washing part being configured to separate the solid included in the reaction mixture by sedimentation and performing countercurrent washing.

The washing part is preferably provided in the reaction vessel positioned furthest downstream in the movement direction of the reaction mixture or on the downstream side of the reaction vessel positioned furthest downstream in the movement direction of the reaction mixture.

In addition, the washing part preferably has a cylindrical structure, in which the solid is sedimented and in which a washing solution is supplied in the opposite direction as the sedimentation direction;

and a static mixing mechanism is provided in the cylindrical structure.

Further, the static mixing mechanism is preferably a static mixer.

The reaction vessels are preferably connected in order of a highest maximum liquid surface level of a liquid that can be housed by each reaction vessel; and the reaction mixture moves successively using a difference in the liquid surface level.

The continuous polymerization apparatus according to this embodiment preferably further includes a housing chamber, wherein the plurality of reaction vessels are preferably housed inside the housing chamber.

Preferably, each of the plurality of reaction vessels is a reaction vessel formed by one or more partition walls provided in the lower part in the housing chamber;

a maximum liquid surface level of a liquid that can be housed by each reaction vessel is defined by a height of the partition wall;

the reaction vessels are connected in order of the highest maximum liquid surface level of a liquid that can be housed by each reaction vessel; and the reaction mixture moves successively using a difference in the liquid surface level.

Further, the continuous polymerization apparatus according to this embodiment preferably further includes a housing chamber, wherein each of the plurality of reaction vessels is preferably a reaction vessel isolated by one or more partition plates having a rotational center inside the housing chamber.

In addition, the continuous polymerization apparatus according to this embodiment preferably further includes a molecular chain extending part in which a reaction to increase the molecular weight of the polymer in the reaction mixture is performed.

Further, the molecular chain extending part is preferably at least one type selected from a polymerization reaction vessel, an extruder, and a heat treatment device.

In addition, the continuous production method for a polymer according to the present invention includes the following steps to be performed in parallel: (a) supplying a polymerization solvent and a reaction raw material to a continuous polymerization apparatus including a plurality of reaction vessels; (b) performing a polymerization reaction in the polymerization solvent inside at least one of the reaction vessels to form a reaction mixture; (c) removing at least a part of water in a gas phase part of the reaction vessel from the reaction vessel; (d) successively moving the reaction mixture through each reaction vessel; and (e) separating a solid included in the reaction mixture by sedimentation and performing countercurrent washing; wherein the respective gas phase parts of the plurality of reaction vessels communicate with one another.

Further, in the continuous production method for a polymer according to this embodiment, the polymerization reaction is preferably a desalting polycondensation reaction; and the solid is preferably the salt produced by the desalting polycondensation reaction.

In addition, in the reaction mixture reaching the reaction vessel positioned furthest downstream in the movement direction of the reaction mixture, the solid is preferably separated and subjected to countercurrent washing.

Further, the continuous production method for a polymer according to this embodiment preferably further includes (f) extending a molecular chain and further increasing the molecular weight of the polymer.

In addition, a polymer liquid is obtained by the continuous production method for a polymer according to this embodiment. The polymer liquid can provide a useful composition capable of forming a polymer alloy, a nanocomposite, or the like.

Embodiments of the present invention will be described in further detail hereinafter using examples. Of course, the present invention is not limited to the following examples, and it goes without saying that various modes are possible for the details. Further, the present invention is not limited to the embodiments described above, and various modifications are possible within the scope indicated in the claims. Embodiments obtained by appropriately combining the technical means disclosed by the embodiments are also included in the technical scope of the present invention. In addition, all documents cited in this specification are incorporated by reference.

EXAMPLES

Measurement Method for Weight Average Molecular Weight
PAS Weight Average Molecular Weight Measurement Method The weight average molecular weight (Mw) of PAS was measured using a high temperature gel permeation chromatograph (GPC) SSC-7101, available from Senshu Scientific, Co., Ltd., under the following conditions. The weight average molecular weight was calculated in terms of polystyrene.

Solvent: 1-chloronaphthalene,
Temperature: 210° C.
Detector: UV detector (360 nm),
Sample injection amount: 200 μL (concentration: 0.05 mass %)
Flow rate: 0.7 mL/min
Standard polystyrene: five types of standard polystyrenes of 616000, 113000, 26000, 8200, and 600

PPSU and PES weight average molecular weight measurement method

The weight average molecular weight (Mw) of PPSU and PES was measured using a high temperature gel permeation chromatograph (GPC) EXTREMA, available from the JASCO Corporation, under the following conditions. The weight average molecular weight was calculated in terms of polystyrene.

Solvent: NMP containing 0.01M LiBr
Temperature: 40° C.
Detector: RI detector
Sample injection amount: 100 μL (concentration: 1 mg/mL)
Flow rate: 1.0 mL/min
Standard polystyrene: Five types of standard polystyrene—427000, 96400, 37900, 17400, and 5560.

Example 1: PAS Production

The PAS continuous production apparatus same as the one illustrated in FIG. 1 was used, with the exception that the apparatus had six reaction vessels formed by partitioning the housing chamber 2 with five partition walls. This PAS continuous production apparatus made of Ti had dimensions of 100 mm (diameter)×300 mm (length), wherein the partition walls were semicircular. After 950 g of NMP was charged into the PAS continuous production apparatus, a temperature 1 of a portion partitioned by first and second partition walls from the upstream side was maintained at 230° C., and a temperature 2 of a portion partitioned by third and fourth partition walls was maintained at 260° C. Raw materials were continuously supplied from each supply line, at a flow rate of 4.61 g/min for an NMP-paradichlorobenzene (pDCB) mixture (NMP:pDCB (weight ratio)=1317.4:342), 0.51 g/min for 48 wt. % NaOH, and 0.76 g/min for 45 wt. % NaSH using a constant-rate pump. Simultaneously, water was continuously removed from the PAS continuous production apparatus using a distillation device connected to the PAS continuous production apparatus while controlling the pressure to a gauge pressure of 0.32 MPa with a pressure adjustment valve, and the pDCB in the removed water was separated with a settler and returned to the PAS continuous production apparatus. In addition, a gas from the distillation device passed through 2 kg of NMP on the downstream side of the pressure adjustment valve, then the gas was further passed through 5 kg of a 5 mass % sodium hydroxide aqueous solution, and then discharged after hydrogen sulfide was completely absorbed and recovered.

The polymerization reaction product was continuously spilled into a sedimentation part from the reaction vessel provided furthest downstream, and the by-product salt NaCl in the polymerization reaction product was sedimented. NMP for washing, which was heated to 260° C., was circulated from the downstream side of the by-product salt sedimentation to the upstream side at a flow rate of 2.5 g/min. The by-product salt was thus sedimented and separated, and the by-product salt NaCl was subjected to continuous countercurrent washing with a washing solvent NMP. The treated reaction product from which the by-product salt containing the NMP for washing was removed was continuously extracted from the treated reaction product recovery line 7.

After the above operation was continued for five hours, the resulting PAS was collected and analyzed. The weight average molecular weight Mw of the PAS according to GPC was 27000.

The NaCl that was separated and recovered at a recovery rate (recovered amount/theoretically produced amount) of 50%, had the purity of 94%, and the $Na_2S$ concentration of 5 mass %.

Example 2: PAS Production

The continuous polymer production apparatus same as the one illustrated in FIG. 3 was used with the exception that the apparatus had 11 reaction vessels formed by partitioning the housing chamber with 10 disc-shaped partition plates. This continuous polymer production apparatus included the housing chamber made of Ti having dimensions of 108 mm (inside diameter)×300 mm (length). All ten partition plates had the same shape and were provided on a rotation shaft with a 5 mm diameter. For each partition plate, as illustrated in FIG. 3, two anchor-type stirring blades were provided in a cross shape on the surface of the plate on the upstream side in the movement direction of the reaction mixture. The diameter of each partition plate was 100 mm, the length (a) of the anchor-type stirring blades in the long axis direction was 90 mm, and the length (b) in the short axis direction was 40 mm. At the position where each partition plate was provided, the proportion of the cross-sectional area of the clearance relative to the vertical cross-section of the internal space of the housing chamber was approximately 14%.

1600 g of NMP was charged into the continuous polymer production apparatus as an organic amide solvent. Then, nitrogen gas was fed from the downstream side of the eleventh reaction vessel counted from the upstream side in the movement direction of the reaction mixture, and a temperature 1 of the first through fourth reaction vessels counted from the upstream side was maintained at 230° C., a temperature 2 of the fifth through eighth reaction vessels was maintained at 260° C., and a temperature 3 of the ninth through eleventh reaction vessels was maintained at 260° C. with an external heater installed at the base of the housing chamber. Here, the flow rate of the nitrogen gas was 0.1 NL/min, and in the standard condition, the nitrogen gas linear velocity passing through the clearance of the partition plate was 0.8 cm/s.

Raw materials were continuously supplied from each supply line, at a flow rate of 2.65 g/min for NMP, 1.61 g/min for p-DCB, 1.63 g/min for a 36.5 wt. % NaSH aqueous solution, and 2.6 g/min for a 16.32 wt. % NaOH aqueous solution using a constant-rate pump. Note that the amount of NMP was 250 g, the amount of p-DCB was 1.030 mol, and the mount of NaOH was 1.030 mol, per 1 mol of NaSH in the supplied raw materials.

In addition, water was continuously removed from the continuous polymer production apparatus using a distillation device connected to the continuous polymer production apparatus while controlling the pressure to a gauge pressure of 0.3 MPa with a pressure adjustment valve. The p-DCB distilled out together with the water was separated and resupplied to the housing chamber as necessary. Further, a small amount of p-DCB and $H_2S$ gas contained in the exhaust gas was respectively absorbed in the NMP and NaOH aqueous solution of the supplied raw materials, recovered, and resupplied to the housing chamber.

The polymerization reaction product was continuously spilled into a sedimentation part from the reaction vessel provided furthest downstream, and the by-product salt in the polymerization reaction product was sedimented. NMP for washing, which was heated to 260° C., was circulated from the downstream side of the by-product salt sedimentation to the upstream side at a flow rate of 2.1 g/min. The by-product salt was thus sedimented and separated, and the by-product salt was subjected to continuous countercurrent washing with a washing solvent NMP. The treated reaction product from which the by-product salt containing the NMP for washing was removed was continuously extracted from the treated reaction product recovery line 7.

After the above operation was continued for twelve hours, the resulting PAS was collected and analyzed. The weight average molecular weight Mw of the PAS according to GPC was 11000.

The by-product salt that was separated and recovered at a recovery rate (recovered amount/theoretically produced amount) of 40%, had the purity of 95%, and the $Na_2S$ concentration of 4 mass %.

Example 3: PPSU Production

A polymerization reaction was performed using the continuous polymer production apparatus same as the one illustrated in FIG. 1 with the exception that the apparatus had 6 reaction vessels formed by partitioning the housing chamber with 5 partition walls. This continuous polymer production apparatus was a SUS reaction apparatus having dimensions of 108 mm (diameter)×300 mm (length), wherein the partition walls were semicircular.

950 g of N-methyl-2-pyrrolidone (NMP) was charged into the continuous production apparatus. Then, nitrogen gas was fed at a flow rate of 0.1 NL/min from the downstream side of the fifth partition wall counted from the upstream side, and a temperature 1 of a portion partitioned by first and second partition walls from the upstream side, i.e. the second reaction vessel from the upstream side, was maintained at 200° C., a temperature 2 of the fourth reaction vessel from the upstream side was maintained at 210° C., and a temperature 3 of the sixth reaction vessel from the upstream side was maintained at 210° C. by an external heater installed at the base of the housing chamber 2. In a steady state, a temperature 4 of the first reaction vessel from the upstream side was 180° C., and a temperature 5 of the fifth reaction vessel from the upstream side was 210° C. Raw materials were continuously supplied for eight hours from each supply line, at a flow rate of 6.4 g/min for NMP, 4,4'-dihydroxybiphenyl (DHBP), dichlorodiphenylsulfone (DCPS), and potassium carbonate (NMP:DCPS (weight ratio)=760: 201.01, DHBP:DCPS (molar ratio)=1:1, DHBP:potassium carbonate (molar ratio)=1:1.1) using a constant-flow pump while stirring with a stirrer.

Note that potassium carbonate with an average particle size of 100 μm or greater in the mixture was insoluble and prone to agglomeration, which yielded poor supply properties. Therefore, potassium carbonate was pulverized (average particle size: 95 μm or smaller) into a slurry at approximately 10000 rpm/min using a homogenizer before it was supplied.

Simultaneously, water produced by the reaction was continuously removed from the continuous production apparatus using a distillation device connected to the continuous production apparatus while controlling the pressure to a gauge pressure of 0.1 MPa with a pressure adjustment valve. In addition, carbon dioxide gas produced by the reaction was discharged to the atmosphere via the distillation device and a water storage tank.

The polymerization reaction product was continuously spilled into a sedimentation part from the reaction vessel furthest downstream, and by-product salt in the polymerization reaction product was sedimented. NMP for washing, which was heated to 210° C., was circulated from the downstream side of the by-product salt sedimentation to the upstream side at a flow rate of 2.5 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise into five times the amount of water, and the product was precipitated and filtered. The product was further washed with methanol and filtered, and the resulting cake was dried for eight hours at 60° C. in a vacuum, and thus a polyphenylsulfone (PPSU) powder was obtained. The weight average molecular weight Mw of the PPSU powder according to GPC in terms of polystyrene was 77500.

The by-product salt that was separated and recovered had a recovery rate (recovered amount/theoretically produced amount) of approximately 50%.

Example 4: PES Production 950 g of N-methyl-2-pyrrolidone (NMP) was charged into the continuous production apparatus used in Example 3. Then, nitrogen gas was fed at a flow rate of 0.1 NL/min from the downstream side of the fifth partition wall counted from the upstream side, and a temperature 1 of a portion partitioned by first and second partition walls from the upstream side, i.e. the second reaction vessel from the upstream side, was maintained at 200° C., a temperature 2 of the fourth reaction vessel from the upstream side was maintained at 210° C., and a temperature 3 of the sixth reaction vessel from the upstream side was maintained at 210° C. by an external heater installed at the base of the housing chamber 2.

Raw materials were continuously supplied for eight hours from each supply line, at a flow rate of 3.6 g/min for NMP, 4,4'-dihydroxydiphenylsulfone (DHDPS), and dichlorodiphenylsulfone (DCPS) (NMP:DCPS (weight ratio)=760:201.01, DHDPS:DCPS (molar ratio)=1:1) and 2.8 g/min for NMP and potassium carbonate (NMP:potassium carbonate (weight ratio)=760:106.41, DHDPS:potassium carbonate (molar ratio)=1:1.1) using a constant-flow pump while stirring with a stirrer.

Note that the pulverization of the potassium carbonate and the adjustment of pressure were performed with the same methods as in Example 3.

The polymerization reaction product was continuously spilled into a sedimentation part from the reaction vessel furthest downstream, and by-product salt in the polymerization reaction product was sedimented. NMP for washing, which was heated to 215° C., was circulated from the downstream side of the by-product salt sedimentation to the upstream side at a flow rate of 2.5 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise into five times the amount of water, and the product was precipitated and filtered. The product was further washed with methanol and filtered, and the resulting cake was dried for eight hours at 60° C. in a vacuum, and thus a polyethersulfone (PES) powder was obtained. The weight average molecular weight Mw of this PES powder according to GPC in terms of polystyrene was 9000.

The by-product salt that was separated and recovered had a recovery rate (recovered amount/theoretically produced amount) of approximately 50%.

Example 5: PEEK Production 950 g of N-methyl-2-pyrrolidone (NMP) was charged into the continuous production apparatus used in Example 3. Then, nitrogen gas was fed at a flow rate of 0.1 NL/min from the downstream side of the fifth partition wall from the upstream side, and a temperature 1 of a portion partitioned by first and second partition walls from the upstream side, i.e. the second reaction vessel from the upstream side, was maintained at 220° C., a temperature 2 of the fifth reaction vessel from the upstream side was maintained at 260° C., and a temperature 3 of the sixth reaction vessel from the upstream side was maintained at 260° C. by an external heater installed at the base of the housing chamber. In a steady state, a temperature 4 of the first reaction vessel from the upstream side was 190° C., and a temperature 5 of the fourth reaction vessel from the upstream side was 250° C. Raw materials were continuously supplied for eight hours from each supply line, at a flow rate of 6.4 g/min for NMP, 4,4'-difluorobenzophenone (DFBP), hydroquinone (HQ), and potassium carbonate (NMP:DFBP (weight ratio) =1202.57:160.00, DFBP:HQ (molar ratio)=1:1, HQ:potassium carbonate (molar ratio)=1:1.1) using a constant-flow pump while stirring with a stirrer.

Note that the pulverization of the potassium carbonate and the adjustment of pressure were performed with the same methods as in Example 3.

The polymerization reaction product was continuously spilled into a sedimentation part from the reaction vessel furthest downstream, and by-product salt in the polymerization reaction product was sedimented. NMP for washing, which was heated to 260° C., was circulated from the downstream side of the by-product salt sedimentation to the upstream side at a flow rate of 2.5 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise into five times the amount of water, and the product was precipitated and filtered. The product was further washed with methanol and filtered, and the resulting cake was dried for eight hours at 60° C. in a vacuum, and thus a polyether ether ketone (PEEK) powder was obtained.

The by-product salt that was separated and recovered had a recovery rate (recovered amount/theoretically produced amount) of approximately 50%. In addition, the reduced viscosity of the PEEK powder was 0.3 [dL/g], and the reduced viscosity was determined with the following method.

Solution Preparation Method

First, 0.1 g of PEEK and 10 mL of 4-chlorophenol were dissolved in an oil bath for 20 minutes at 180° C. while heating and stirring. After the solution was cooled to room temperature, 3 mL of the solution was diluted with 7 mL of o-dichlorobenzene.

Reduced Viscosity Measurement Method

The reduced viscosity was measured with an Ubbelohde viscometer at 35° C.

Calculation of Reduced Viscosity

The viscosity ($\eta\,0$) of the solvent was measured using an Ubbelohde viscometer. The specific viscosity ratio (($\eta-\eta\,0$)/$\eta\,0$) was determined from the viscosity ($\eta$) of the prepared solution and the viscosity ($\eta\,0$) of the solvent, and this specific viscosity ratio was divided by the concentration of the solution (0.3 g/dL) to determine the reduced viscosity (dL/g).

Example 6: PEEK Production

The same continuous polymer production apparatus as in Example 2 was used with the exception that the apparatus had 10 reaction vessels formed by partitioning the housing chamber with 9 disc-shaped partition plates. 1500 g of N-methyl-2-pyrrolidone (NMP) was charged into the continuous polymer production apparatus. Then, nitrogen gas was fed from the downstream side of the tenth reaction vessel counted from the upstream side in the movement direction of the reaction mixture, and a temperature 1 of the third reaction vessel counted from the upstream side was maintained at 210° C., a temperature 2 of the fifth reaction vessel was maintained at 240° C., a temperature 3 of the ninth reaction vessel was maintained at 260° C., and a temperature 4 of the tenth reaction vessel was maintained at 260° C. with an external heater installed at the base of the housing chamber. Here, the flow rate of the nitrogen gas was 1 NL/min, and in the standard condition, the nitrogen gas linear velocity passing through the clearance of the partition plate was 8 cm/s.

Raw materials were continuously supplied from each supply line for six hours, at a flow rate of 13.8 g/min for NMP, 4,4'-difluorobenzophenone (DFBP), hydroquinone (HQ), and potassium carbonate (NMP:DFBP (weight ratio)=2804.43:654.53, DFBP:HQ (molar ratio)=1.01:1, HQ:potassium carbonate (molar ratio)=1:1.1) using a constant-rate pump while stirring with a stirrer.

Note that the pulverization of the potassium carbonate and the adjustment of pressure were performed with the same methods as in Example 3.

The polymerization reaction product was continuously spilled into a sedimentation part from the reaction vessel furthest downstream, and by-product salt in the polymerization reaction product was sedimented. NMP for washing, which was heated to 265° C., was circulated from the downstream side of the by-product salt sedimentation to the upstream side at a flow rate of 16.3 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise into five times the amount of water, and the solid content that was produced was filtered. The product was further washed with methanol and filtered, and the resulting cake was dried for eight hours at 60° C. in a vacuum, and thus a polyether ether ketone (PEEK) powder was obtained. The reduced viscosity of the PEEK powder was 0.6 [dL/g], and the reduced viscosity was determined with the method described above.

Example 7: PPSU Production

The same continuous polymer production apparatus as in Example 2 was used with the exception that the apparatus had 11 reaction vessels formed by partitioning the reaction vessel main body with 10 disc-shaped partition plates. 1700 g of N-methyl-2-pyrrolidone (NMP) was charged into the continuous polymer production apparatus as an organic amide solvent. Then, nitrogen gas was fed from the downstream side of the eleventh reaction vessel counted from the upstream side in the movement direction of the reaction mixture, and a temperature 1 of the second reaction vessel counted from the upstream side was maintained at 200° C., and a temperature 2 of the fifth reaction vessel was maintained at 210° C. with an external heater installed at the base of the housing chamber. Here, the flow rate of the nitrogen gas was 0.1 NL/min, and in the standard condition, the nitrogen gas linear velocity passing through the clearance of the partition plate was 0.8 cm/s.

Raw materials were continuously supplied from the supply lines for eight hours at a flow rate of 8.5 g/min for a mixture of NMP, 4,4'-dihydroxybiphenyl (DHBP), dichlorodiphenylsulfone (DCPS), and potassium carbonate (NMP:DCPS (weight ratio)=760:201.01, DHBP:DCPS (molar ratio)=1:1, DHBP: potassium carbonate (molar ratio)=1:1.1) using a constant-rate pump while stirring with a stirrer. Note that potassium carbonate with an average particle diameter of 95 μm or greater in the mixture was pulverized (average particle diameter: 95 μm or less) into a slurry at approximately 10000 rpm/min using a homogenizer before it was supplied.

Simultaneously, water was continuously removed from the continuous polymer production apparatus using a distillation device connected to the continuous polymer production apparatus while controlling the pressure to a gauge pressure of 0.1 MPa with a pressure adjustment valve. In addition, carbon dioxide gas produced by the reaction was discharged to the atmosphere via the distillation device and a water storage tank.

The polymerization reaction product was continuously spilled into a sedimentation part from the reaction vessel furthest downstream, and by-product salt in the polymerization reaction product was sedimented. NMP for washing, which was heated to 210° C., was circulated from the downstream side of the by-product salt sedimentation to the upstream side at a flow rate of 12.4 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for eight hours, the resulting reaction mixture was collected and analyzed. The reaction mixture was added dropwise into five times the amount of water, and the product was precipitated and filtered. The product was further washed with methanol and filtered, and the resulting cake was dried for eight hours at 60° C. in a vacuum, a polyphenylsulfone (PPSU) powder was obtained. The weight average molecular weight Mw of this PPSU powder according to GPC in terms of polystyrene was 130000.

REFERENCE SIGNS LIST 1a, 1b, 1c: Reaction vessels
2, 22: Housing chambers
3a, 3b: Side walls
4: Supply line
5: Washing part
6: Static mixing mechanism 7: Treated reaction product recovery line
8a, 8b: Partition walls
9a, 9b, 9c: Reaction mixtures
10a, 10b, 10c: Stirring blades
11: Stirring shaft
12: Rotary driving device
13: Discharge line
14: Water removing part
20a, 20b: Partition plate
21: Rotation shaft
28: Gas feeding part
29: Gas feeding line
50: First reaction vessel
51: Second reaction vessel
52: Third reaction vessel
65: First pipe
67: Second pipe
70: Ventilation part
100, 200, 300: Continuous polymerization apparatus

The invention claimed is:

1. A continuous polymerization apparatus comprising a plurality of reaction vessels;
wherein the plurality of reaction vessels are configured such that a reaction mixture successively moves through each reaction vessel;
in the plurality of reaction vessels, gas phase parts formed above the reaction mixture communicate with one another; and
the continuous polymerization apparatus includes a washing part, the washing part being configured to separate a solid included in the reaction mixture by sedimentation and to perform countercurrent washing; wherein the washing part has a cylindrical structure, in which the solid is sedimented and in which a washing solution is supplied in the opposite direction as the sedimentation direction; and a static mixing mechanism is provided in the cylindrical structure; and wherein the reaction vessels are connected in order of a highest maximum liquid surface level of a liquid that can be housed by each reaction vessel; and the reaction mixture moves successively using a difference in the liquid surface level.

2. The continuous polymerization apparatus according to claim 1, wherein the washing part is provided in the reaction vessel positioned furthest downstream in the movement direction of the reaction mixture or on the downstream side of the reaction vessel positioned furthest downstream in the movement direction of the reaction mixture.

3. The continuous polymerization apparatus according to claim 1, wherein the static mixing mechanism is a static mixer.

4. The continuous polymerization apparatus according to claim 1, further comprising a housing chamber, wherein the plurality of reaction vessels are housed inside the housing chamber.

5. The continuous polymerization apparatus according to claim 4, wherein each of the plurality of reaction vessels is a reaction vessel formed by one or more partition walls provided in the lower part in the housing chamber;
a maximum liquid surface level of a liquid that can be housed by each reaction vessel is defined by a height of the partition wall;
the reaction vessels are connected in order of the highest maximum liquid surface level of a liquid that can be housed by each reaction vessel; and
the reaction mixture moves successively using a difference in the liquid surface level.

6. The continuous polymerization apparatus according to claim 1, further comprising a housing chamber, wherein each of the plurality of reaction vessels is a reaction vessel isolated by one or more partition plates having a rotational center provided inside the housing chamber.

7. The continuous polymerization apparatus according to claim 1, further comprising a molecular chain extending part in which a reaction to increase a molecular weight of a polymer in the reaction mixture is performed.

8. The continuous polymerization apparatus according to claim 7, wherein the molecular chain extending part is at least one type selected from a polymerization reaction vessel, an extruder, and a heat treatment device.

9. A continuous production method for a polymer comprising:
(a) supplying a polymerization solvent and a reaction raw material to a continuous polymerization apparatus including a plurality of reaction vessels;
(b) performing a polymerization reaction in the polymerization solvent inside at least one of the reaction vessels to form a reaction mixture;
(c) removing at least a part of water in a gas phase part of the reaction vessel from the reaction vessel;
(d) successively moving the reaction mixture through each reaction vessel; and
(e) separating a solid included in the reaction mixture by sedimentation and performing countercurrent washing;
steps (a), (b), (c), (d), and (e) being performed in parallel;
wherein the respective gas phase parts of the plurality of reaction vessels communicate with one another; wherein the washing part has a cylindrical structure, in which the solid is sedimented and in which a washing solution is supplied in the opposite direction as the sedimentation direction; and a static mixing mechanism is provided in the cylindrical structure; and wherein the reaction vessels are connected in order of a highest maximum liquid surface level of a liquid that can be housed by each reaction vessel; and the reaction mixture moves successively using a difference in the liquid surface level.

10. The continuous production method for a polymer according to claim 9, wherein the polymerization reaction is a desalting polycondensation reaction; and
the solid is a salt produced by the desalting polycondensation reaction.

11. The continuous production method for a polymer according to claim 9, wherein in the reaction mixture reaching the reaction vessel positioned furthest downstream in the movement direction of the reaction mixture, the solid is separated and subjected to countercurrent washing.

12. The continuous production method for a polymer according to claim 9, further comprising (f) extending a molecular chain and further increasing a molecular weight of the polymer.

13. A production method for a composition including a plurality of polymers, the method comprising:
(a) supplying a polymerization solvent and a reaction raw material to a continuous polymerization apparatus including a plurality of reaction vessels;
(b) performing a polymerization reaction in the polymerization solvent inside at least one of the reaction vessels to form a reaction mixture;
(c) removing at least a part of water in a gas phase part of the reaction vessel from the reaction vessel;
(d) successively moving the reaction mixture through each reaction vessel; and (e) separating a solid included in the reaction mixture by sedimentation and performing countercurrent washing;

steps (a), (b), (c), (d) and (e) being performed in parallel;

wherein the respective gas phase parts of the plurality of reaction vessels communicate with one another; and the method further includes (f) mixing a reaction mixture from which the solid has been removed and a polymer that is different from the polymer included in the reaction mixture; wherein the washing part has a cylindrical structure, in which the solid is sedimented and in which a washing solution is supplied in the opposite direction as the sedimentation direction; and a static mixing mechanism is provided in the cylindrical structure; and wherein the reaction vessels are connected in order of a highest maximum liquid surface level of a liquid that can be housed by each reaction vessel; and the reaction mixture moves successively using a difference in the liquid surface level.

\* \* \* \* \*